(12) United States Patent
Sato

(10) Patent No.: US 8,777,742 B2
(45) Date of Patent: Jul. 15, 2014

(54) GAME DEVICE, CONTROL METHOD FOR A GAME DEVICE, AND NON-TRANSITORY INFORMATION STORAGE MEDIUM

(75) Inventor: Keiko Sato, Minato-ku (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 392 days.

(21) Appl. No.: 13/309,299

(22) Filed: Dec. 1, 2011

(65) Prior Publication Data

US 2012/0142436 A1 Jun. 7, 2012

(30) Foreign Application Priority Data

Dec. 2, 2010 (JP) ................................. 2010-269051

(51) Int. Cl.
*A63F 13/02* (2006.01)

(52) U.S. Cl.
CPC ......... *A63F 13/02* (2013.01); *A63F 2300/1087* (2013.01)
USPC ......................................................... 463/32

(58) Field of Classification Search
CPC ................. A63F 2300/66; A63F 2300/6607; A63F 2300/6615; A63F 2300/6661; A63F 2300/6669; A63F 2300/6684; A63F 2300/1087; A63F 2300/1093; A63F 2009/2435; A63F 2300/69; A63F 2300/695; A63B 24/0003; A63B 24/0006; A63B 24/0087; A63B 24/0021; A63B 24/0062; A63B 24/0084
USPC .......... 463/30, 31, 32, 33; 473/140, 141, 151, 473/152, 199, 200, 202, 209, 221
See application file for complete search history.

(56) References Cited

U.S. PATENT DOCUMENTS

| | | | |
|---|---|---|---|
| 6,626,759 B1* | 9/2003 | Matsuoka | 463/31 |
| 7,292,151 B2* | 11/2007 | Ferguson et al. | 340/573.1 |
| 7,492,268 B2* | 2/2009 | Ferguson et al. | 340/573.1 |
| 7,706,636 B2* | 4/2010 | Higashino et al. | 382/302 |
| 7,821,407 B2* | 10/2010 | Shears et al. | 340/573.1 |
| 7,825,815 B2* | 11/2010 | Shears et al. | 340/573.1 |
| 7,952,483 B2* | 5/2011 | Ferguson et al. | 340/573.1 |
| 7,978,081 B2* | 7/2011 | Shears et al. | 340/573.1 |
| 8,159,354 B2* | 4/2012 | Ferguson et al. | 340/573.1 |
| 8,414,393 B2* | 4/2013 | Tarama et al. | 463/36 |
| 2002/0160823 A1 | 10/2002 | Watabe et al. | |
| 2009/0258706 A1* | 10/2009 | Rofougaran et al. | 463/39 |

FOREIGN PATENT DOCUMENTS

JP            3866474 B2      1/2007

\* cited by examiner

*Primary Examiner* — David L Lewis
*Assistant Examiner* — Matthew D Hoel
(74) *Attorney, Agent, or Firm* — Sughrue Mion, PLLC

(57) ABSTRACT

A game device in which a first comparison unit compares an exemplary model posture (posture that is supposed to be adopted by a player) at a reference time and a posture of the player indicated by posture data acquired by a posture data acquiring unit at a compared time. A second comparison unit executes at least one of: a comparison between a different posture from the exemplary model posture at the reference time and the posture of the player indicated by the posture data acquired at the compared time; and a comparison between the exemplary model posture at the reference time and a different posture from the posture of the player indicated by the posture data acquired at the compared time. An output control unit causes an output based on a comparison between results from the first and second comparison units.

5 Claims, 15 Drawing Sheets

FIG.7
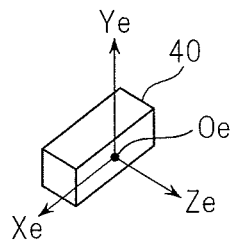
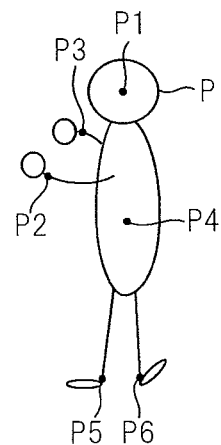
FIG.8
| BODY PART | POSITION |
|---|---|
| HEAD (P1) | $(X_{P1}, Y_{P1}, Z_{P1})$ |
| ... | ... |
| LEFT WRIST (P2) | $(X_{P2}, Y_{P2}, Z_{P2})$ |
| RIGHT WRIST (P3) | $(X_{P3}, Y_{P3}, Z_{P3})$ |
| ... | ... |
| WAIST (P4) | $(X_{P4}, Y_{P4}, Z_{P4})$ |
| ... | ... |
| LEFT ANKLE (P5) | $(X_{P5}, Y_{P5}, Z_{P5})$ |
| RIGHT ANKLE (P6) | $(X_{P6}, Y_{P6}, Z_{P6})$ |

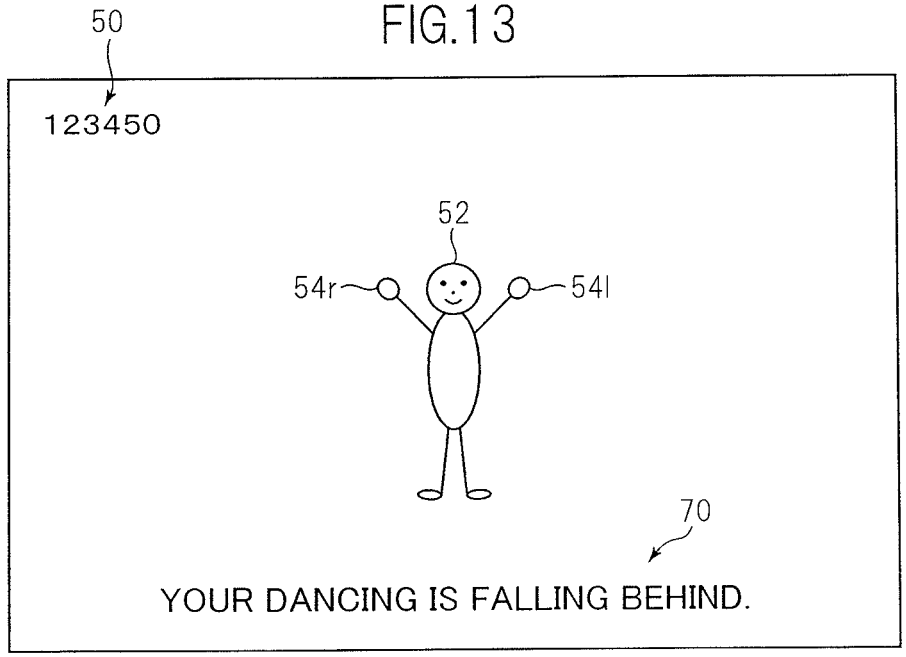
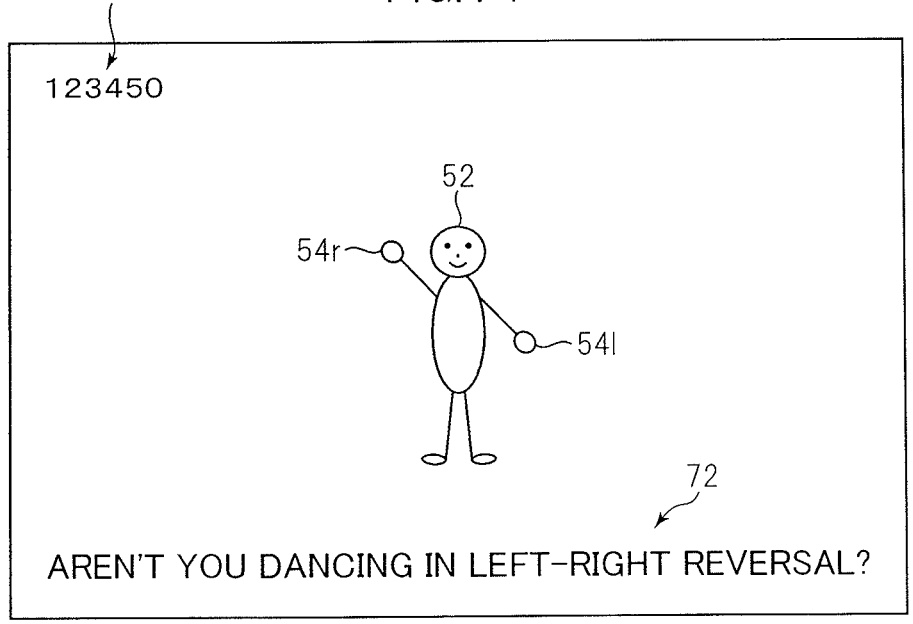

FIG.16

| EVALUATION TIME | EXEMPLARY MODEL POSTURE DATA |
|---|---|
| 0 | ------ |
| 0 | ------ |
| 0 | ------ |
| 0 | ------ |
| 0 | ------ |
| 0 | ------ |
| 0 | ------ |
| 1 | ------ |
| 0 | ------ |
| 0 | ------ |
| 1 | ------ |
| 1 | ------ |
| 1 | ------ |
| 1 | ------ |
| 1 | ------ |
| 1 | ------ |
| 1 | ------ |
| 1 | ------ |
| 0 | ------ |

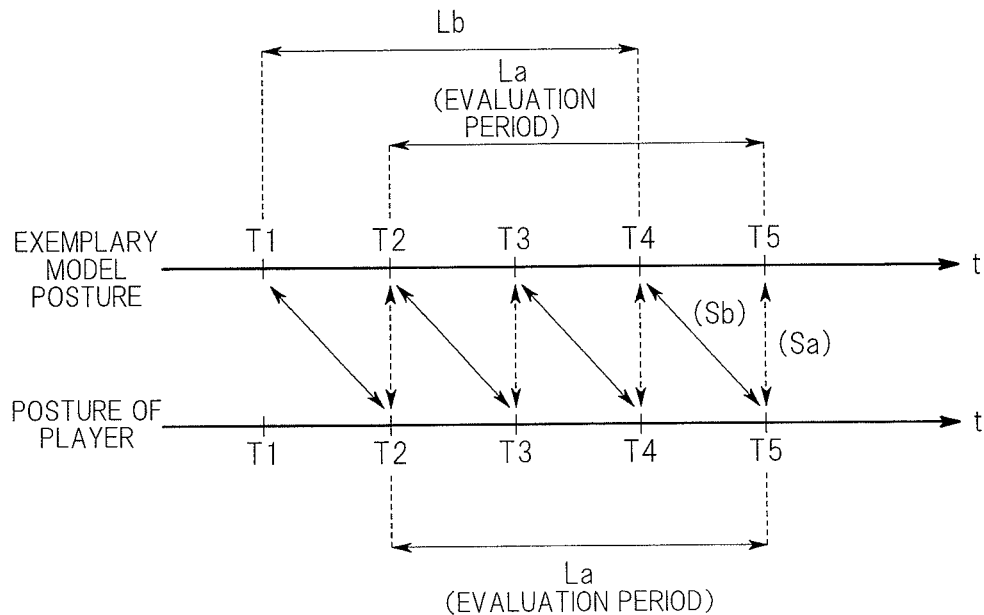
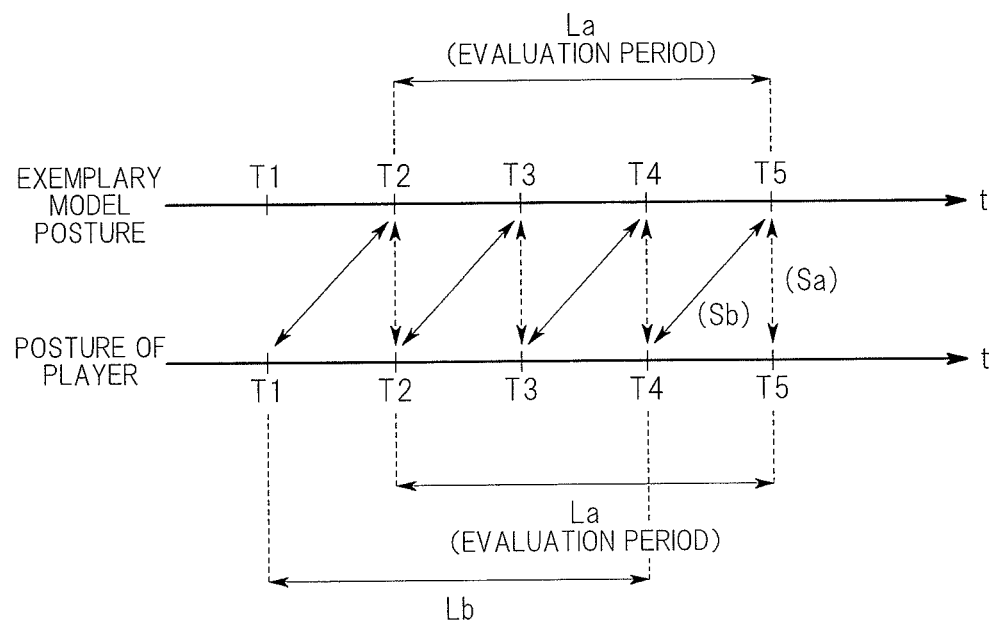

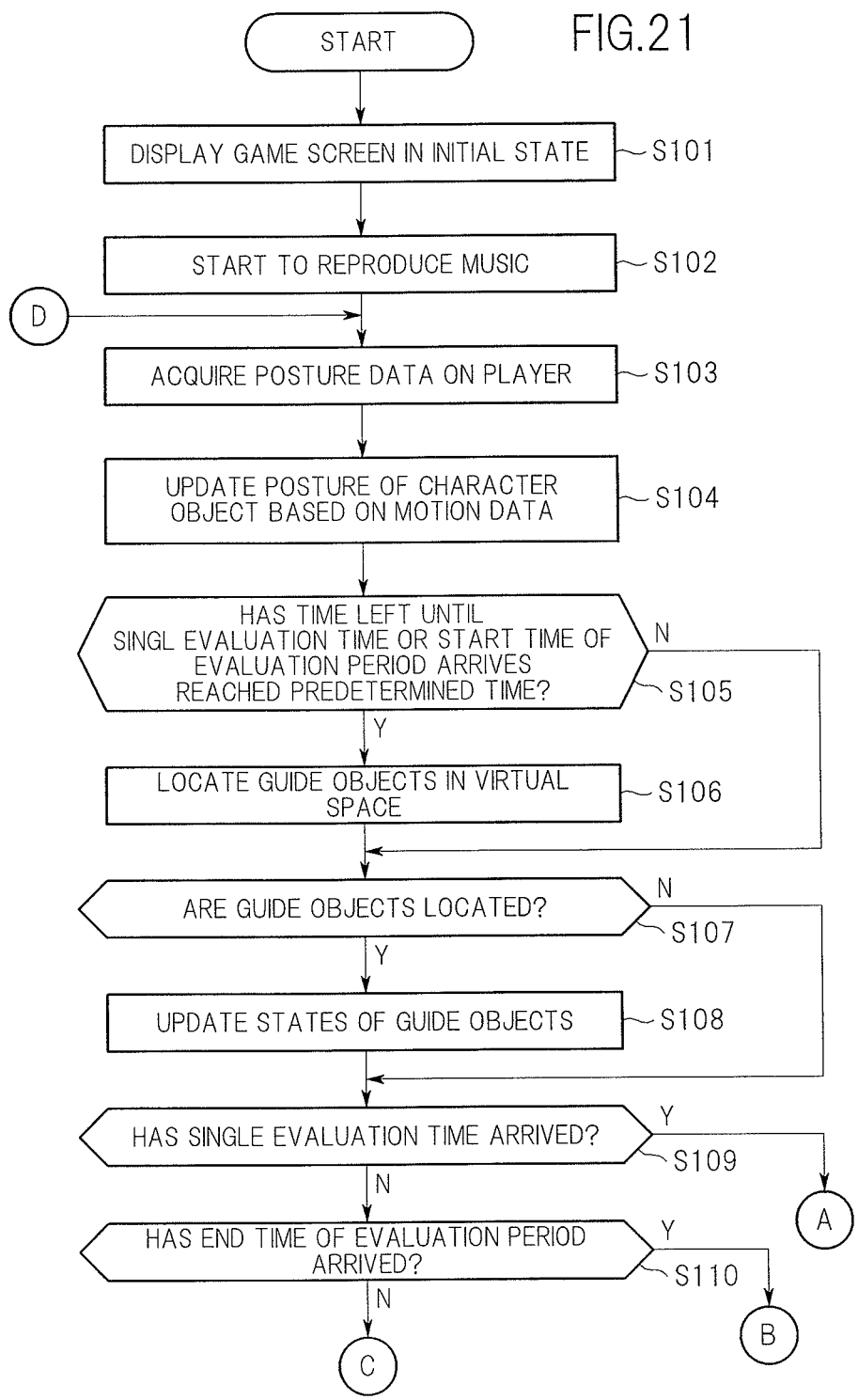

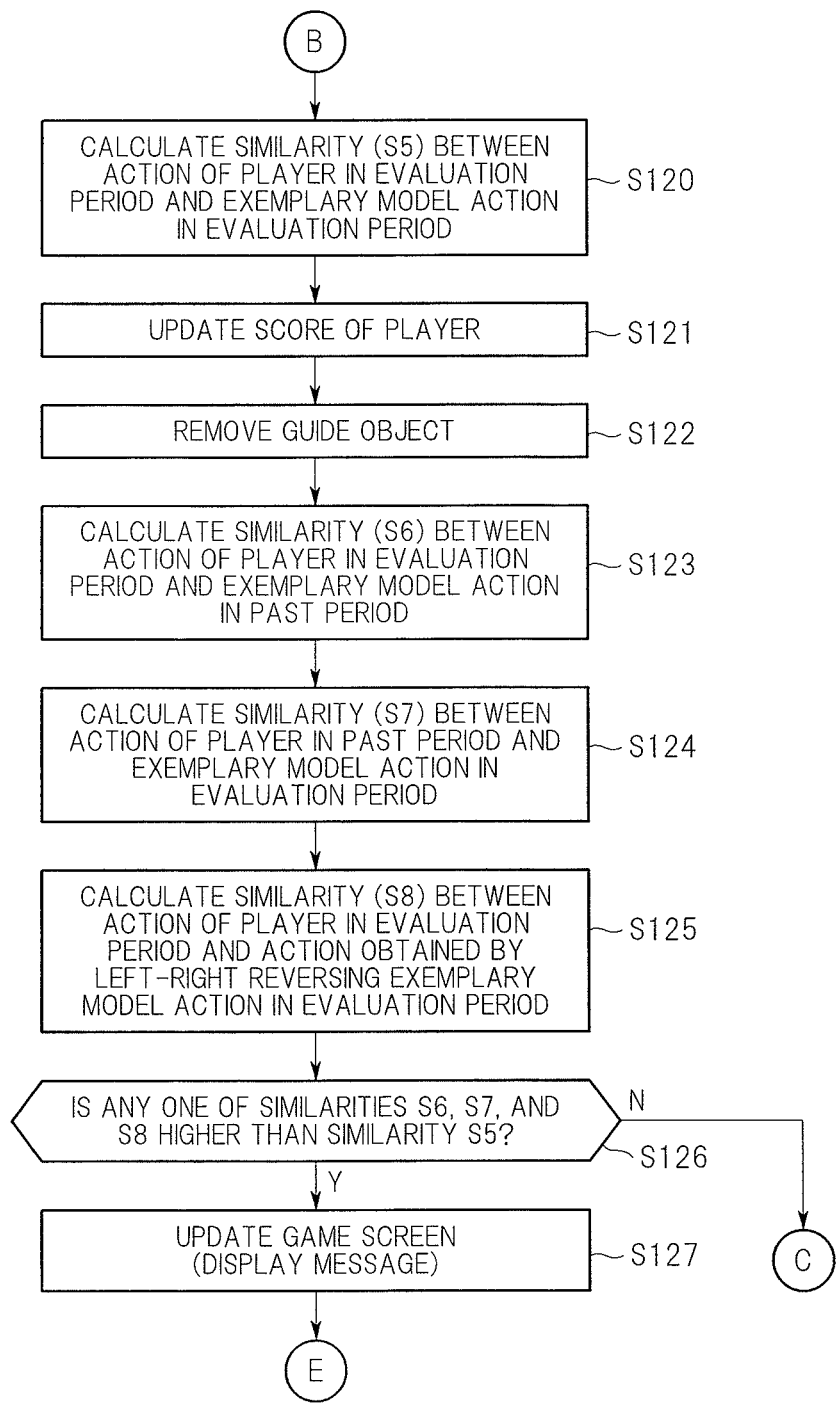

GAME DEVICE, CONTROL METHOD FOR A GAME DEVICE, AND NON-TRANSITORY INFORMATION STORAGE MEDIUM

CROSS-REFERENCE TO RELATED APPLICATION

The present application claims priority from Japanese application JP 2010-269051 filed on Dec. 2, 2010, the content of which is hereby incorporated by reference into this application.

BACKGROUND OF THE INVENTION

1. Field of the Invention

The present invention relates to a game device, a control method for a game device, and a non-transitory information storage medium.

2. Description of the Related Art

There is proposed a game device capable of detecting a posture of a player. For example, there is proposed a game device capable of detecting a posture of a player based on a photographed image generated by a photographing unit and a detection result from an infrared sensor (see, for example, JP 3866474 B2).

SUMMARY OF THE INVENTION

It is conceivable that, for example, the above-mentioned game device realizes a dance game configured so that a player performs a predetermined dance in time with music. It is desired for such a dance game to realize a function of assisting the player in grasping any weakness in their dance in detail if the player is not dancing well. This is because realizing such a function can assist the player in improving their gaming (dancing) skill.

The present invention has been made in view of the above-mentioned problem, and an object thereof is to provide a game device, a control method for a game device, and a non-transitory information storage medium, which are capable of assisting a player in grasping any weakness in their game play in detail.

In order to solve the above-mentioned problem, according to the present invention, there is provided a game device, which executes a game configured so that a player aims to adopt an exemplary model posture at a reference time, including: means for acquiring data stored in means for storing the data, the data relating to the exemplary model posture that is supposed to be adopted by the player in the game; posture data acquiring means for acquiring posture data relating to a posture adopted by the player; a first comparison means for executing a comparison between the exemplary model posture that is supposed to be adopted by the player at the reference time and the posture of the player indicated by the posture data acquired at a compared time that is set based on the reference time; a second comparison means for executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and output control means for causing output means to perform an output based on a comparison between a comparison result from the first comparison means and a comparison result from the second comparison means, the second comparison means including at least one of: means for executing a comparison between the exemplary model posture that is supposed to be adopted by the player at one of a time before the reference time and a time after the reference time and the posture of the player indicated by the posture data acquired at the compared time; means for executing a comparison between a posture obtained by making a predetermined change to the exemplary model posture that is supposed to be adopted by the player at the reference time and the posture of the player indicated by the posture data acquired at the compared time; means for executing a comparison between the exemplary model posture that is supposed to be adopted by the player at the reference time and the posture of the player indicated by the posture data acquired at one of a time before the compared time and a time after the compared time; and means for executing a comparison between the exemplary model posture that is supposed to be adopted by the player at the reference time and a posture obtained by making a predetermined change to the posture of the player indicated by the posture data acquired at the compared time.

According to the present invention, there is also provided a control method for a game device, which executes a game configured so that a player aims to adopt an exemplary model posture at a reference time, including: a step of acquiring data stored in means for storing the data, the data relating to the exemplary model posture that is supposed to be adopted by the player in the game; a posture data acquiring step of acquiring posture data relating to a posture adopted by the player; a first comparison step of executing a comparison between the exemplary model posture that is supposed to be adopted by the player at the reference time and the posture of the player indicated by the posture data acquired at a compared time that is set based on the reference time; a second comparison step of executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and an output control step of causing output means to perform an output based on a comparison result from the first comparison step and a comparison result from the second comparison step, the second comparison step including at least one of: executing a comparison between the exemplary model posture that is supposed to be adopted by the player at one of a time before the reference time and a time after the reference time and the posture of the player indicated by the posture data acquired at the compared time; executing a comparison between a posture obtained by making a predetermined change to the exemplary model posture that is supposed to be adopted by the player at the reference time and the posture of the player indicated by the posture data acquired at the compared time; executing a comparison between the exemplary model posture that is supposed to be adopted by the player at the reference time and the posture of the player indicated by the posture data acquired at one of a time before the compared time and a time after the compared time; and executing a comparison between the exemplary model posture that is supposed to be adopted by the player at the reference time and a posture obtained by making a predetermined change to the posture of the player indicated by the posture data acquired at the compared time.

According to the present invention, there is further provided a program for causing a computer to function as a game device, which executes a game configured so that a player aims to adopt an exemplary model posture at a reference time, the program further causing the computer to function as: means for acquiring data stored in means for storing the data, the data relating to the exemplary model posture that is supposed to be adopted by the player in the game; posture data acquiring means for acquiring posture data relating to a posture adopted by the player; a first comparison means for executing a comparison between the exemplary model posture that is supposed to be adopted by the player at the reference time and the posture of the player indicated by the posture data acquired at a compared time that is set based on the reference time; a second comparison means for executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and output control means for causing output means to perform an output based on a comparison between a comparison result from the first comparison means and a comparison result from the second comparison means, the second comparison means including at least one of: means for executing a comparison between the exemplary model posture that is supposed to be adopted by the player at one of a time before the reference time and a time after the reference time and the posture of the player indicated by the posture data acquired at the compared time; means for executing a comparison between a posture obtained by making a predetermined change to the exemplary model posture that is supposed to be adopted by the player at the reference time and the posture of the player indicated by the posture data acquired at the compared time; means for executing a comparison between the exemplary model posture that is supposed to be adopted by the player at the reference time and the posture of the player indicated by the posture data acquired at one of a time before the compared time and a time after the compared time; and means for executing a comparison between the exemplary model posture that is supposed to be adopted by the player at the reference time and a posture obtained by making a predetermined change to the posture of the player indicated by the posture data acquired at the compared time.

Further, according to the present invention, there is provided a non-transitory computer-readable information storage medium storing the above-mentioned program.

According to the present invention, it is possible to assist the player in grasping any weakness in their game play in detail.

According to an aspect of the present invention, the posture obtained by making the predetermined change to the exemplary model posture that is supposed to be adopted by the player at the reference time may be a posture obtained by left-right reversing the exemplary model posture that is supposed to be adopted by the player at the reference time. The second comparison means may include means for executing a comparison between the posture obtained by left-right reversing the exemplary model posture that is supposed to be adopted by the player at the reference time and the posture of the player indicated by the posture data acquired at the compared time.

Further, according to an aspect of the present invention, the posture obtained by making the predetermined change to the posture of the player indicated by the posture data acquired at the compared time may be a posture obtained by left-right reversing the posture of the player indicated by the posture data acquired at the compared time. The second comparison means may include means for executing a comparison between the exemplary model posture that is supposed to be adopted by the player at the reference time and the posture obtained by left-right reversing the posture of the player indicated by the posture data acquired at the compared time.

BRIEF DESCRIPTION OF THE DRAWINGS

In the accompanying drawings:

FIG. 7 is an explanatory diagram of posture data on the player;

FIG. 8 is a diagram illustrating an example of the posture data on the player;

FIG. 13 is a diagram illustrating another example of the game screen;

FIG. 14 is a diagram illustrating another example of the game screen;

FIG. 16 is a diagram illustrating an example of exemplary model data;

FIG. 19 is an explanatory diagram of another example of the operations of the second comparison unit and the output control unit;

FIG. 20 is an explanatory diagram of another example of the operations of the second comparison unit and the output control unit;

FIG. 21 is a flowchart illustrating an example of processing executed by the game device;

FIG. 23 is a flowchart illustrating the example of the processing executed by the game device.

DETAILED DESCRIPTION OF THE INVENTION

Hereinafter, detailed description is given of an example of an embodiment of the present invention with reference to the drawings. A game device according to the embodiment of the present invention is implemented by, for example, a consumer game machine (stationary game machine), a portable game machine, an arcade game machine, a mobile phone, a personal digital assistant (PDA), or a personal computer. In this specification, description is given of a case where the game device according to the embodiment of the present invention is implemented by a consumer game machine.

Figure 1:
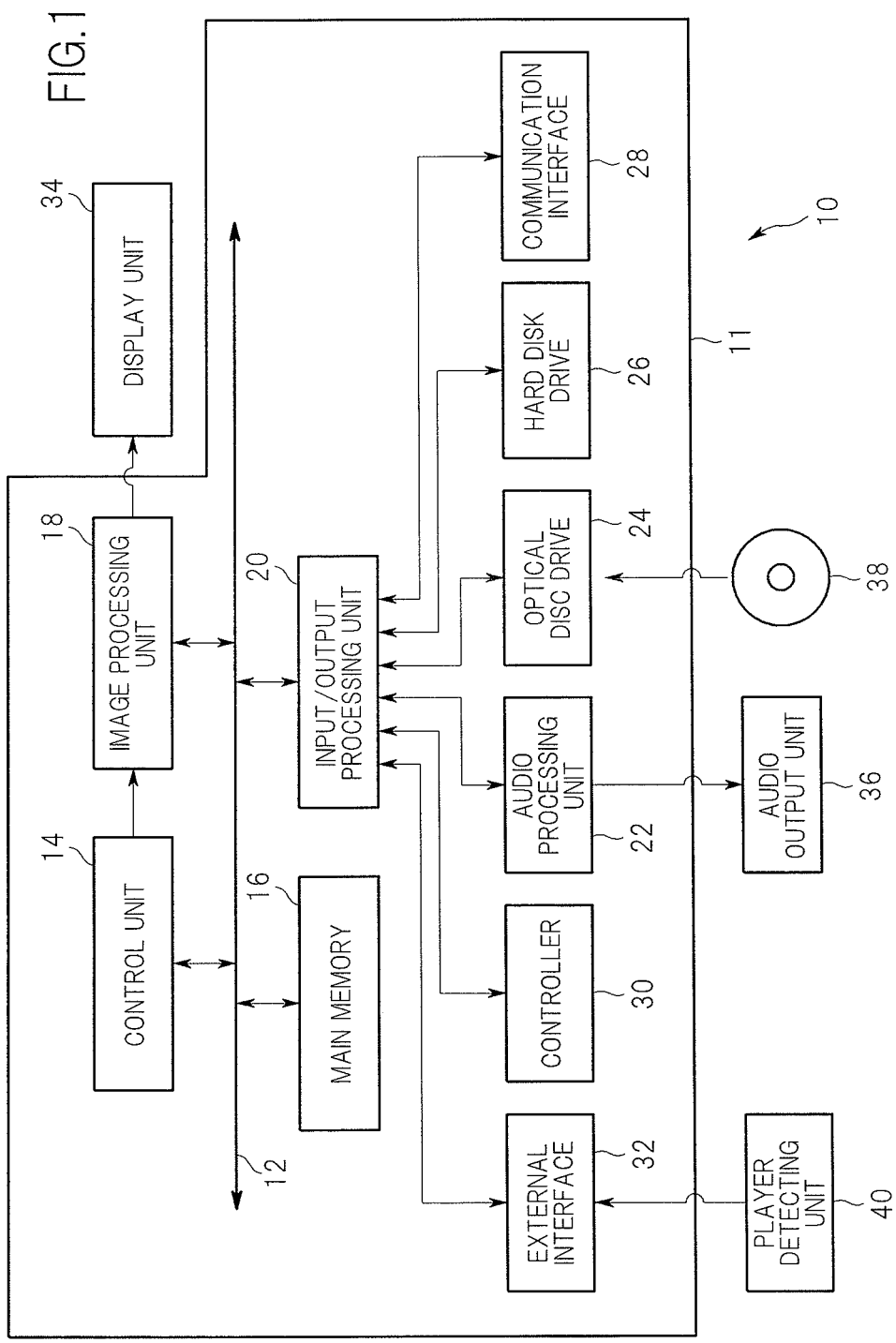
FIG. 1 is a diagram illustrating a hardware configuration of a game device according to an embodiment of the present invention.

FIG. 1 illustrates a hardware configuration of the game device according to the embodiment. As illustrated in FIG. 1, a game device 10 includes a consumer game machine 11, a display unit 34, an audio output unit 36, an optical disc 38 (information storage medium), and a player detecting unit 40. The display unit 34 and the audio output unit 36 are connected to the consumer game machine 11. The display unit 34 may be a display device such as a consumer television set or a liquid crystal display, for example. The audio output unit 36 may be an audio outputting device such as a speaker included in the consumer television set or headphones, for example.

The consumer game machine 11 is a known computer game system. The consumer game machine 11 includes a bus 12, a control unit 14, a main memory 16, an image processing unit 18, an input/output processing unit 20, an audio processing unit 22, an optical disc drive 24, a hard disk drive 26, a communication interface 28, a controller 30, and an external interface 32. The bus 12 is used for exchanging addresses and data among the components of the consumer game machine 11.

The control unit 14 includes one or a plurality of microprocessors. The control unit 14 executes various types of control processing for components and information processing based on a program read from the optical disc 36. The main memory 16 includes, for example, a RAM. The program and data read from the optical disc 38 are written into the main memory 16. The main memory 16 is also used as a working memory for the control unit 14. The image processing unit 18 includes a VRAM, and renders, based on image data supplied from the control unit 14, a screen in the VRAM. Then, the image processing unit 18 converts the screen rendered in the VRAM into video signals, and outputs the video signals to the display unit 34.

The input/output processing unit 20 is an interface for the control unit 14 to access the audio processing unit 22, the optical disc drive 24, the hard disk drive 26, the communication interface 28, the controller 30, and the external interface 32. The audio processing unit 22 includes a sound buffer, and outputs, from the audio output unit 36, audio data that has been loaded into the sound buffer. The communication interface 28 is an interface for connecting the consumer game machine 11 to a communication network such as the Internet by wire or wireless.

The optical disc drive 24 reads a program or data recorded on the optical disc 38. The hard disk drive 26 is a commonly-used hard disk device (auxiliary storage device). Herein, the optical disc 38 is used for supplying the program or the data to the consumer game machine 11. Alternatively, another information storage medium, such as a memory card, may be used. It should be noted that the program or the data may be supplied to the consumer game machine 11 from a remote place via a communication network, for example. The program or the data, which is supposed to be stored on the optical disc 38 in the following description, may be stored on the hard disk drive 26.

The controller 30 is an operation unit for a player to perform operations. The input/output processing unit 20 scans states of the operation members of the controller 30 at fixed intervals (for example, every $1/60^{th}$ of a second), and then transfers an operation signal indicating a result of the scanning to the control unit 14 via the bus 12.

The external interface 32 is an interface for connecting a peripheral device thereto. In the case of this embodiment, the player detecting unit 40 is connected to the external interface 32. Note that the description is given here assuming that the player detecting unit 40 is connected to the external interface 32 as the peripheral device, but the player detecting unit 40 may be incorporated into the consumer game machine 11.

The player detecting unit 40 detects a position of a representative body part (for example, head, waist, right wrist, left wrist, right ankle, or left ankle) of a player. By using a detection result from the player detecting unit 40, it is possible to determine a posture and a movement of the player. For this reason, the game device 10 can execute, for example, a game configured so that the player plays by moving their body without using the controller 30.

Figure 2:
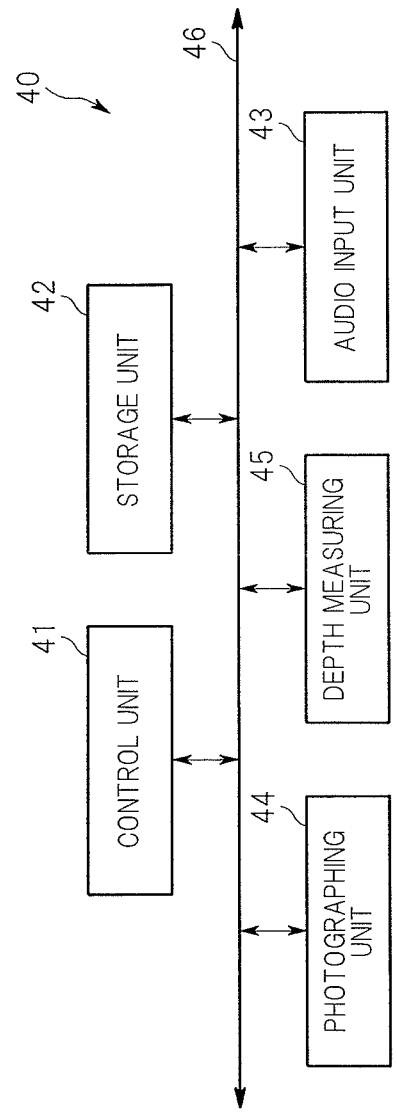
FIG. 2 is a diagram illustrating a hardware configuration of a player detecting unit.
Figure 3:
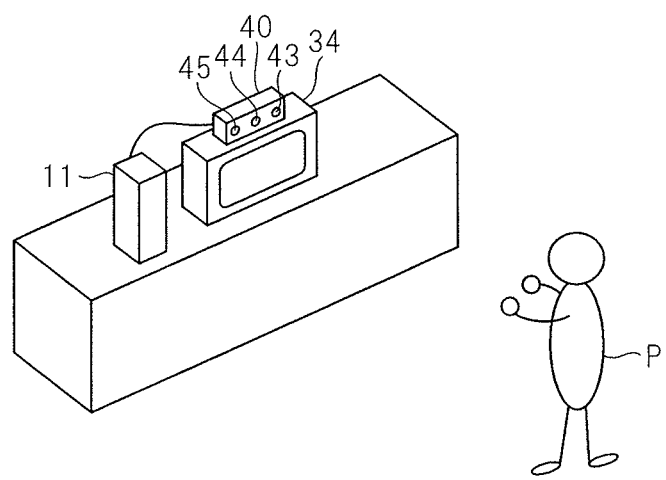
FIG. 3 is a diagram illustrating how a player plays a game.

The player detecting unit 40 will be described in more detail. FIG. 2 illustrates a hardware configuration of the player detecting unit 40. Further, FIG. 3 is a diagram illustrating how the player plays a game. The player detecting unit 40 will be described with reference to those figures.

As illustrated in FIG. 2, the player detecting unit 40 includes a control unit 41, a storage unit 42, an audio input unit 43, a photographing unit 44, a depth measuring unit 45, and a bus 46. The bus 46 is used for exchanging addresses and data among the respective units of the player detecting unit 40.

The control unit 41 includes at least one microprocessor, and executes processing based on a program stored in the storage unit 42. The storage unit 42 stores the program executed by the control unit 41. Further, the storage unit 42 is used for storing various kinds of data acquired by the audio input unit 43, the photographing unit 44, or the depth measuring unit 45. The audio input unit 43 includes, for example, a microphone. For example, the audio input unit 43 is used for acquiring a voice emitted from a player P.

Figure 4:
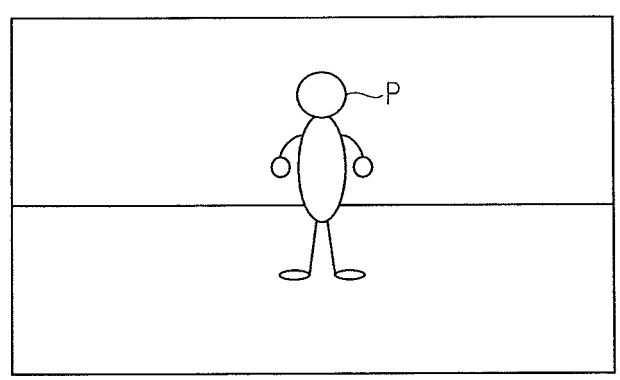
FIG. 4 is a diagram illustrating an example of a photographed image generated by a photographing unit.

The photographing unit 44 includes, for example, a CCD camera. The photographing unit 44 generates a photographed image (for example, RGB digital image), for example, every predetermined time (for example, $1/60^{th}$ of a second). As illustrated in FIG. 3, the player detecting unit 40 is placed in the vicinity of the display unit 34, and the photographing unit 44 photographs an area in front of the display unit 34. As illustrated in FIG. 3, the player P is positioned in the area in front of the display unit 34 to play a game, and hence the player P appears in the photographed image generated by the photographing unit 44. FIG. 4 illustrates an example of the photographed image.

The depth measuring unit 45 includes, for example, an infrared sensor. For example, the infrared sensor includes an infrared emitting device and an infrared receiving device (for example, infrared diodes). The infrared sensor emits infrared light to detect reflected light obtained in a case where the emitted infrared light is reflected by a person or object.

Figure 5:
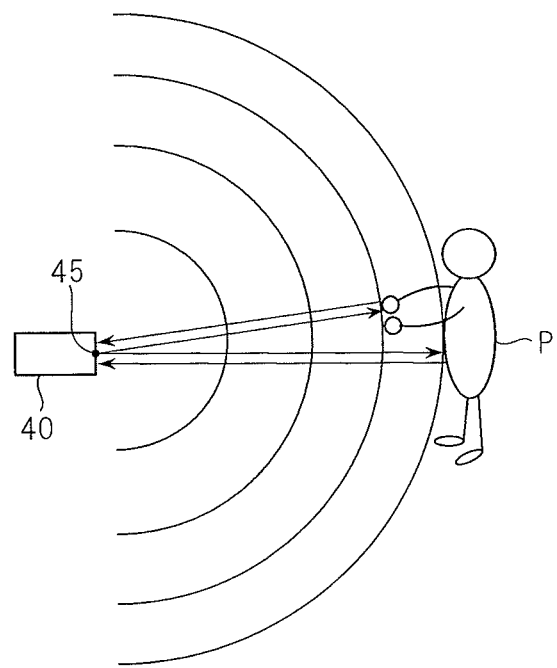
FIG. 5 is an explanatory diagram of emission of infrared light and detection of reflected light.

FIG. 5 is an explanatory diagram of emission of the infrared light and detection of the reflected light. As illustrated in FIG. 5, the depth measuring unit 45 (infrared emitting device) emits pulsed infrared light at predetermined intervals. The infrared light emitted from the depth measuring unit 45 spreads spherically with the position of the infrared emitting device as a center point, and strikes a surface of a person (player P) or object. The infrared light that has struck the surface is reflected, and the reflected infrared light is detected by the infrared receiving device of the depth measuring unit 45. That is, the reflected light obtained by inverting the phase of the emitted infrared light by 180 degrees is detected.

As illustrated in FIG. 5, in a case where the player P is holding out both their hands forward, the held-out hands are closer to the depth measuring unit 45 (infrared sensor) than a torso of the player P. In this case, a time of flight (TOF) of the infrared light reflected by both the hands of the player P is shorter than the TOF of the infrared light reflected by the torso of the player P. Note that "TOF" represents a time elapsed after the infrared light is emitted until the reflected light is received.

The depth measuring unit 45 measures a depth (depth-direction distance) of each of pixels within the photographed image of the photographing unit 44 based on a detection result of the reflected light. The "depth of a pixel" represents a distance from a measurement reference position to a part of an object that appears in the pixel. For example, the depth of the pixel within an area in which the right hand of the player P appears indicates a distance from the measurement reference position to the right hand of the player P. Further, the "measurement reference position" represents a position that serves as a reference in measuring the depth, for example, the position of the infrared sensor.

Specifically, the depth measuring unit 45 measures the above-mentioned depth based on the TOF elapsed after the infrared light is emitted until the reflected light is received. For example, a value obtained by dividing by 2 the product of the time (that is, TOF) elapsed after the infrared light is emitted until the reflected light is received and the velocity of the infrared light corresponds to the distance (that is, depth) from the measurement reference position to the person or object that reflects the infrared light. By executing such processing, the depth measuring unit 45 acquires the above-mentioned depth.

Measurement results from the depth measuring unit 45 are expressed as an image. For example, the measurement results from the depth measuring unit 45 are expressed as a grayscale image. In the same manner as the photographing unit 44, the depth measuring unit 45 also measures the depth every predetermined time (for example, $\frac{1}{60}^{th}$ of a second), and generates the image (hereinafter, referred to as "depth image") that expresses the measurement results.

Figure 6:
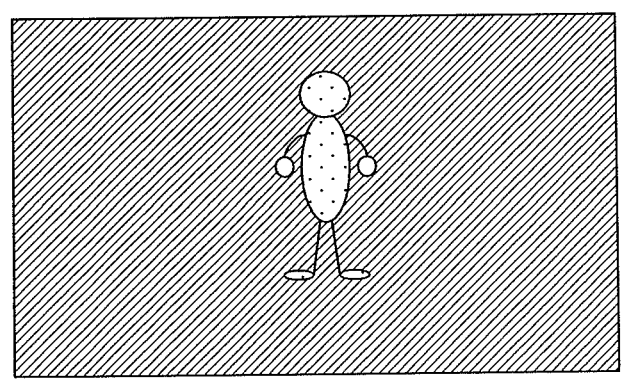
FIG. 6 is a diagram illustrating an example of a depth image.

FIG. 6 is a diagram illustrating an example of the depth image. The depth image illustrated in FIG. 6 is an image indicating the depth of each of the pixels of the photographed image illustrated in FIG. 4. Note that the depth image illustrated in FIG. 6 includes a diagonally shaded area marked with diagonal lines (for example, background of the player P), a dotted area marked with dots (for example, head portion and torso portion of the player P), and a white area marked with neither diagonal lines nor dots (for example, both hands of the player P). The diagonally shaded area indicates that a brightness thereof is lower than those of the dotted area and the white area, and the dotted area indicates that a brightness thereof is lower than that of the white area.

In the depth image, the depth is expressed by the brightness (pixel value). In the depth image illustrated in FIG. 6, the brightness is set to become higher as the depth becomes smaller (that is, the distance from the depth measuring unit 45 becomes shorter). For example, as illustrated in FIG. 5, in the case where the player P is holding out both their hands forward, both the hands of the player P are closer to the depth measuring unit 45 than to the torso of the player P. For this reason, in the depth image illustrated in FIG. 6, the brightness of the pixels corresponding to both the hands of the player P is higher than the brightness of the pixel corresponding to the torso of the player P. Note that in the depth image, the brightness may be set to become higher as the depth becomes larger (that is, the distance from the depth measuring unit 45 becomes longer).

The player detecting unit 40 acquires posture data relating to the posture of the player P based on the photographed image generated by the photographing unit 44 and the depth image acquired by the depth measuring unit 45.

For example, the player detecting unit 40 detects pixels corresponding to an outline of the player P by detecting a portion of the depth image in which the depth changes greatly. If there is no person or object positioned around the player P, the TOF of the infrared light emitted toward the player P is significantly different from the TOF of the infrared light emitted toward a surrounding area of the player P. As a result, there is a large difference in depth between the player P and the surrounding area of the player P. For this reason, it is possible to detect the outline of the player P by detecting the portion in which the depth changes greatly.

Note that a method of detecting the outline of the player P is not limited to the above-mentioned method. For example, it is also possible to detect the outline of the player P by detecting a portion of the photographed image in which the brightness of the pixels changes greatly.

Subsequently, the player detecting unit 40 references color information (lightness in RGB) on pixels enclosed by the outline of the player P in the photographed image. Then, the player detecting unit 40 identifies pixels corresponding to each body part of the player P based on the color information on the pixels. For this identification method, for example, a known method is applicable, such as a pattern matching method in which the object (that is, each body part of the player P) is extracted from the image through a comparison with a comparison image.

Based on positions (two-dimensional coordinates in the photographed image or the depth image) and the depth of the pixels identified as described above, the player detecting unit 40 calculates three-dimensional coordinates of a representative body part (for example, head, waist, right wrist, left wrist, right ankle, or left ankle) of the player P. For example, the player detecting unit 40 calculates the three-dimensional coordinates of the body part of the player P by carrying out predetermined matrix transformation processing on the positions and the depth of the pixels corresponding to the body part. The matrix transformation processing is executed through, for example, processing similar to transformation processing performed between world coordinates and screen coordinates in three-dimensional graphics technology.

Further, the three-dimensional coordinates of the body part of the player P are expressed by, for example, as illustrated in FIG. 7, a coordinate value in an XeYeZe coordinate system with the position of the player detecting unit 40 (photographing unit 44) set as an origin Oe. Note that in FIG. 7, a Ze-axis direction represents, for example, a line-of-sight direction of the photographing unit 44 (CCD camera). Further, an Xe-axis direction represents a direction perpendicular to the Ze-axis direction and a direction corresponding to a horizontal direction when viewed from the player detecting unit 40 (photographing unit 44). In addition, a Ye-axis direction represents a direction perpendicular to both the Ze-axis direction and the Xe-axis direction and a direction corresponding to a vertical direction when viewed from the player detecting unit 40 (photographing unit 44).

The data indicating the three-dimensional coordinates of each body part of the player P acquired as described above corresponds to the posture data on the player P. FIG. 8 illustrates an example of the posture data on the player P. The posture data on the player P illustrated in FIG. 8 includes the three-dimensional coordinates of a head P1, a left wrist P2, a right wrist P3, a waist P4, a left ankle P5, and a right ankle P6 of the player P. Note that the three-dimensional coordinates of a body part other than the above-mentioned body parts may be included in the posture data on the player P.

The posture data on the player P is acquired, for example, every predetermined time (for example, $1/60^{th}$ of a second) and supplied from the player detecting unit 40 to the consumer game machine 11. The control unit 14 can grasp the posture of the player P (position of each body part of the player P) based on the posture data on the player P. Further, the control unit 14 can also grasp the movement of the body of the player P by grasping a change in the posture of the player P (change in the position of each body part of the player P).

On the game device 10 having the above-mentioned configuration, a game configured so that the player P plays by moving their body in the area in front of the display unit 34 is executed by the program stored on the optical disc 38. For example, a dance game configured so that the player P dances in time with music is executed on the game device 10.

Figure 9:
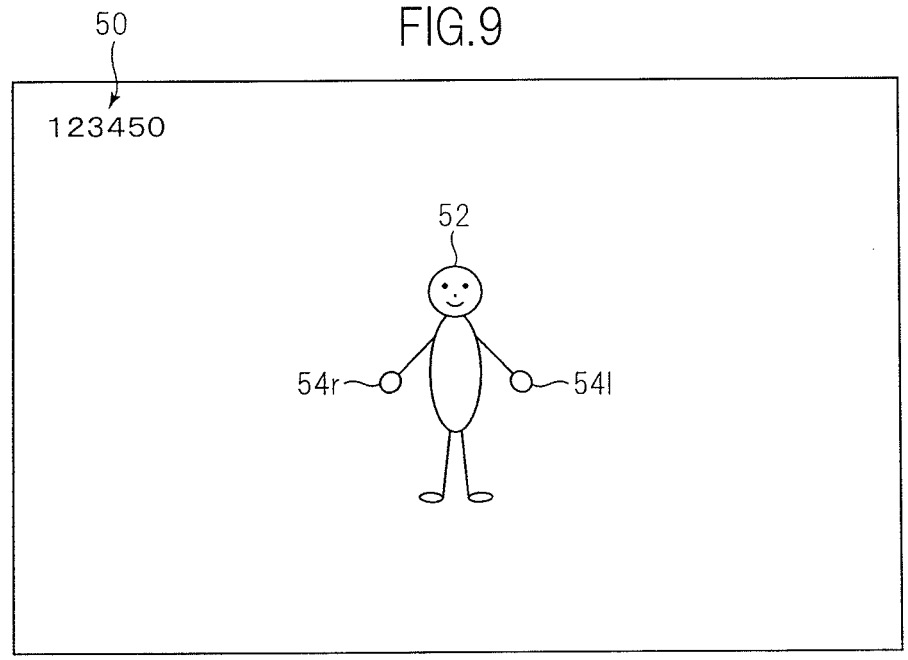
FIG. 9 is a diagram illustrating an example of a game screen.

FIG. 9 illustrates an example of a game screen displayed on the display unit 34. A score 50 of the player P and a character object 52 indicating a dancer are displayed on the game screen illustrated in FIG. 9.

The character object 52 plays a role of showing to the player P a dance to be performed by the player P. The game screen illustrated in FIG. 9 performs display so that the character object 52 faces the player P, and hence the character object 52 performs a dance that is left-right reversed to the dance that is supposed to be performed by the player P.

The player P aims to dance in the same manner as the character object 52 by watching the character object 52. For example, in a case where the character object 52 moves its hand on the right side when viewed from the player P (that is, its left hand 54l) rightward when viewed from the player P (that is, leftward when viewed from the character object 52), the player P moves their right hand rightward in the same manner. Further, for example, in a case where the character object 52 moves its hand on the left side when viewed from the player P (that is, its right hand 54r) leftward when viewed from the player P (that is, rightward when viewed from the character object 52), the player P moves their left hand leftward in the same manner.

Note that on the game screen, the character object 52 viewed from its back may be displayed. In this case, the character object 52 does not need to perform the dance that is left-right reversed to the dance that is supposed to be performed by the player P. For this reason, the character object 52 may be instructed to directly perform the dance that is supposed to be performed by the player P.

This game is provided with an evaluation time (reference time) for evaluating the dance of the player P. A posture adopted by the player P at the evaluation time is compared with a posture (exemplary model posture) supposed to be adopted by the player P at the evaluation time, and the dance of the player P is evaluated based on a comparison result thereof. If a similarity between the posture of the player P and the exemplary model posture is high, the dance of the player P is evaluated highly.

Figure 10:
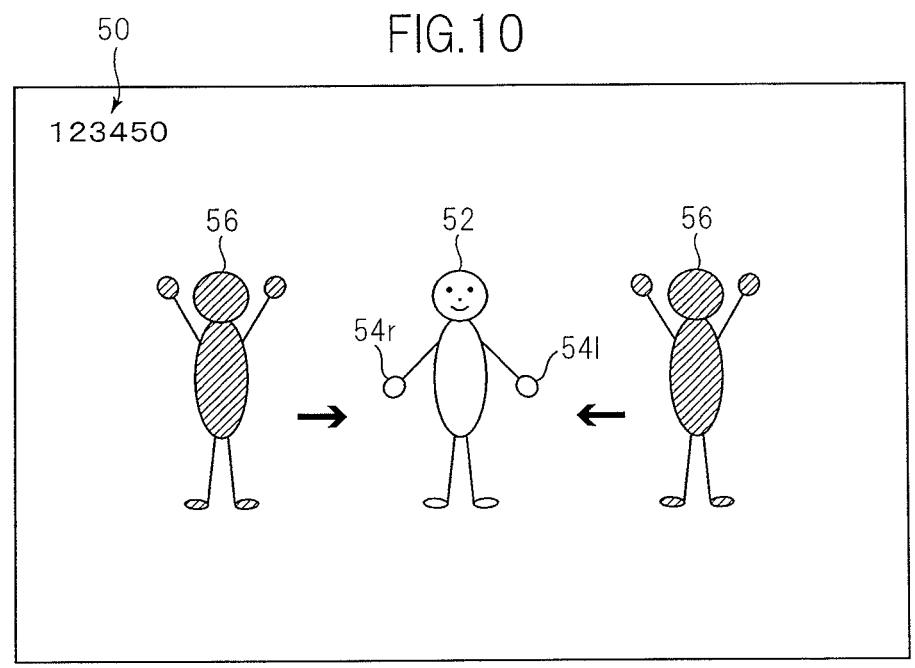
FIG. 10 is a diagram illustrating another example of the game screen.

FIG. 10 illustrates an example of the game screen displayed when the evaluation time is nearing. On the game screen illustrated in FIG. 10, two guide objects 56 are displayed. The guide objects 56 play a role of showing (predicting) to the player P an arrival of the evaluation time and the exemplary model posture that is supposed to be adopted by the player P at the evaluation time.

The guide objects 56 are displayed when the evaluation time is nearing. Specifically, when a remaining time before the arrival of the evaluation time reaches a predetermined time (for example, time corresponding to two bars of a music), the two guide objects 56 are displayed on the left and right of the character object 52 when viewed from the player P.

The guide objects 56 are silhouettes of the character object 52 to be displayed at the evaluation time, indicating a posture to be adopted by the character object 52 at the evaluation time. After being displayed in initial positions, the guide objects 56 move toward the character object 52. At the evaluation time, the guide objects 56 reach the character object 52 to coincide with the character object 52. After coinciding with the character object 52, the guide objects 56 disappear from the game screen.

For example, in the case of the example illustrated in FIG. 10, if the player P is holding up both their hands in the same manner as the guide objects 56 illustrated in FIG. 10 at the time (evaluation time) at which the guide objects 56 coincide with the character object 52, the player P can obtain an excellent evaluation. The game device 10 is configured to allow the player P to grasp the arrival of the evaluation time and the exemplary model posture that is supposed to be adopted by the player P at the evaluation time by displaying the above-mentioned guide objects 56.

Note that the evaluation times may be provided continuously over a given period (see FIG. 16). In the following description, the period in which the evaluation times are provided continuously is referred to as "evaluation period". An action (change in posture) performed by the player P in the evaluation period is compared with an exemplary model action (change in exemplary model posture) that is supposed to be performed by the player P in the evaluation period, and the dance of the player P is evaluated based on a comparison result thereof. For example, if the similarity between the action of the player P and the exemplary model action is high, the dance of the player P is evaluated highly.

Figure 11:
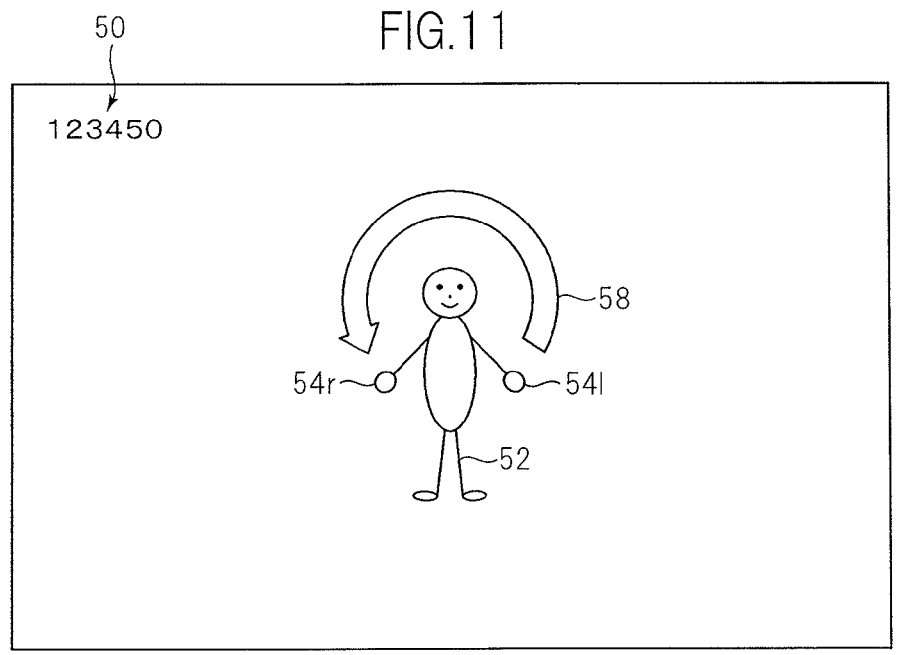
FIG. 11 is a diagram illustrating another example of the game screen.

FIG. 11 illustrates an example of the game screen displayed when the evaluation period is approaching. On the game screen illustrated in FIG. 11, a guide object 58 is displayed. The guide object 58 plays a role of showing (predicting) to the player P the arrival of the evaluation period and the exemplary model action that is supposed to be performed by the player P in the evaluation period.

The guide object 58 is displayed when the evaluation period is nearing. Specifically, when the remaining time before the arrival of the evaluation period reaches a predetermined time (for example, time corresponding to two bars of music), the guide object 58 is displayed.

The guide object 58 indicates a moving path of the body part (for example, left hand 54l) followed in a case where the character object 52 moves the body part. The guide object 58 illustrated in FIG. 11 indicates the moving path of the left hand 54l of the character object 52. In this case, the movement of the left hand 54l is such a movement that "the left hand 54l is raised in an arc just beside the body moving above the head, and then the left hand 54l is lowered similarly in an arc down to the vicinity of the right hand 54r".

For example, in the case of the example illustrated in FIG. 11, when the evaluation period arrives, the color of the guide object 58 gradually changes from the beginning edge toward the end edge in synchronization with the movement of the left hand 54l of the character object 52. When the evaluation period ends (that is, when the character object 52 finishes moving the left hand 54l along the moving path indicated by the guide object 58), the guide object 58 disappears from the game screen. If the player P moves their right hand in the same manner as the movement of the left hand 541 of the character object 52 with the help of the guide object 58, the player P can obtain an excellent evaluation. The game device 10 is configured to allow the player P to grasp the arrival of the evaluation period and the exemplary model action that is supposed to be performed by the player P in the evaluation period by displaying the above-mentioned guide object 58.

Figure 12:
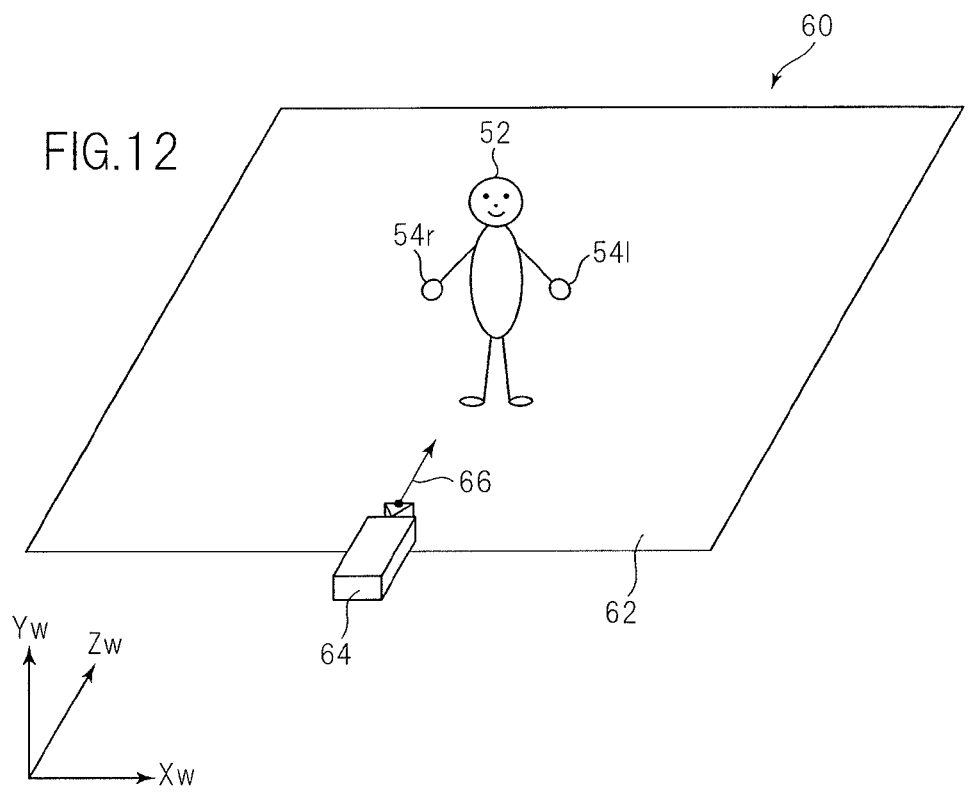
FIG. 12 is a diagram illustrating an example of a virtual space.

On the game device 10, a virtual space is configured in the main memory 16 for generating the game screen. FIG. 12 is a diagram illustrating an example of the virtual space. A virtual space 60 illustrated in FIG. 12 is a virtual three-dimensional space in which three coordinate axes (Xw-axis, Yw-axis, and Zw-axis) perpendicular to one another are set. The virtual space 60 illustrated in FIG. 12 has a state corresponding to the game screen illustrated in FIG. 9.

As illustrated in FIG. 12, a floor object 62 that expresses a floor is located in the virtual space 60. Further, the character object 52 is located on the floor object 62. A virtual camera 64 (viewpoint) is set in the virtual space 60. The virtual space 60 viewed from the virtual camera 64 is displayed on the game screen.

The virtual camera 64 has a position, a line-of-sight direction 66, and an angle of view set so that the character object 52 is constantly displayed in a predetermined area (for example, center area) within the game screen. In the case of this embodiment, the character object 52 is configured to dance in substantially the same position, and the position, the line-of-sight direction 66, and the angle of view of the virtual camera 64 are also fixed.

Although not shown in FIG. 12, the guide objects 56 and 58 may be located in the virtual space 60. For example, to display the game screen illustrated in FIG. 10, the guide objects 56 are located in the virtual space 60. Further, for example, to display the game screen illustrated in FIG. 11, the guide object 58 is located in the virtual space 60.

Hereinafter, description is given of a technology for realizing an assist function of assisting the player P to grasp any weakness in their dance in detail in the above-mentioned dance game.

FIG. 13 is an explanatory diagram of the above-mentioned assist function, illustrating an example of the game screen. Displayed on the game screen illustrated in FIG. 13 is a message 70 indicating that the player P is dancing out of rhythm, specifically, that the dance of the player P is falling behind the music (that is, that the player P is moving their body parts, such as hands or feet, too late). The message 70 is displayed if it is determined that the dance of the player P is falling behind the music. The displaying of the message 70 allows the player P to grasp that their dance is falling behind the music (that is, that the time of moving their hands or feet is late).

Note that if the dance of the player P is getting ahead of the music (that is, if the player P is moving their body parts, such as hands or feet, too early), a message to that effect is displayed on the game screen.

FIG. 14 is another explanatory diagram of the above-mentioned assist function, illustrating an example of the game screen. Displayed on the game screen illustrated in FIG. 14 is a message 72 indicating that the player P is dancing in a left-right reversal. The message 72 is displayed if it is determined that the player P is dancing in a left-right reversal. For example, the message 72 is displayed when the player P is holding up their right hand in spite of the fact that their left hand is supposed to be held up. The displaying of the message 72 allows the player P to grasp that the player P is dancing in a left-right reversal.

Figure 15:
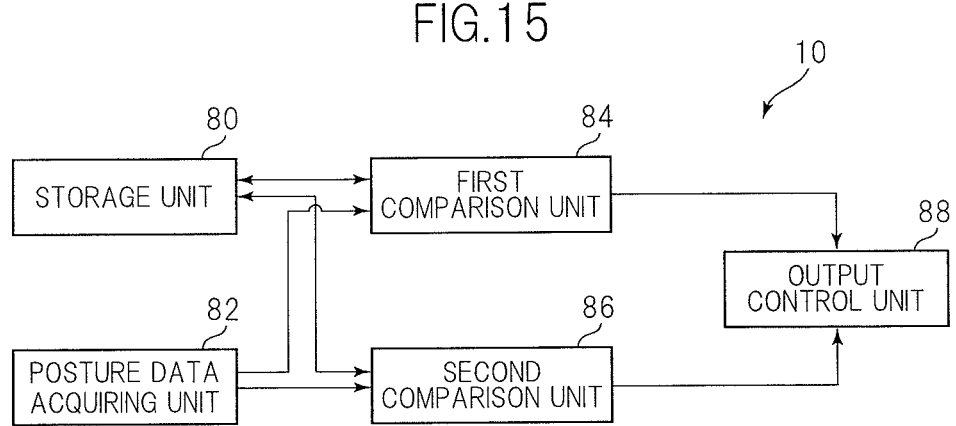
FIG. 15 is a functional block diagram of the game device according to the embodiment of the present invention.

FIG. 15 is a functional block diagram mainly illustrating functional blocks relating to the above-mentioned assist function among functional blocks implemented by the game device 10. As illustrated in FIG. 15, the game device 10 includes a storage unit 80, a posture data acquiring unit 82, a first comparison unit 84, a second comparison unit 86, and an output control unit 88.

The storage unit 80 is implemented by at least one of, for example, the main memory 16, the hard disk drive 26, and the optical disc 38. Note that the storage unit 80 may be implemented by a storage device provided to another device that is communicatively connected to the game device 10 via a communication network. The functional blocks other than the storage unit 80 are implemented by, for example, the control unit 14 executing the program read from the optical disc 38.

First, description is given of the storage unit 80. The storage unit 80 stores various kinds of data necessary to execute the game.

For example, the storage unit 80 stores music data. The music data is obtained by saving general popular music or the like in a predetermined data format.

Further, for example, the storage unit 80 stores model data indicating a shape of the character object 52. Note that the model data on the character object 52 is also used as the model data on the guide objects 56. Further, the storage unit 80 also stores the model data on the guide object 58.

Further, for example, the storage unit 80 stores motion data on the character object 52. The motion data is data that defines the posture of the character object 52 adopted in each of frames in a case where the character object 52 is performing an action. By changing the posture of the character object 52 according to the motion data, the character object 52 comes to perform the action. In the following description, the changing of the posture of the character object 52 according to the motion data is referred to as "reproduce the motion data".

In the case of this embodiment, the storage unit 80 stores the motion data for causing the character object 52 to perform the action corresponding to the action that is supposed to be performed by the player P. Specifically, the storage unit 80 stores the motion data for causing the character object 52 to perform the dance that is supposed to be performed by the player P in a left-right reversal. The motion data defines changes in the posture of the character object 52 adopted while the music is being reproduced. By reproducing the motion data in synchronization with the reproduction of the music, the character object 52 comes to perform a dance that is left-right reversed to the dance that is supposed to be performed by the player P, in time with the music.

Further, for example, the storage unit 80 stores data relating to the evaluation time (evaluation period). Further, the storage unit 80 stores data relating to the exemplary model posture that is supposed to be adopted by the player P at the evaluation time (exemplary model action that is supposed to be performed by the player P in the evaluation period).

FIG. 16 illustrates an example of exemplary model data stored in the storage unit 80. The exemplary model data illustrated in FIG. 16 is data indicating the evaluation time and the exemplary model posture that is supposed to be adopted by the player P. In FIG. 16, a t-axis represents a time axis, indicating a time elapsed since the reproduction of the music started.

The exemplary model data shows the evaluation time in units of, for example, $1/256^{th}$ of a bar of music. However, for the sake of simplicity, the exemplary model data illustrated in FIG. 16 shows the evaluation time in units of $1/8^{th}$ of a bar of music. Further, the exemplary model data illustrated in FIG. 16 shows whether or not each time is an evaluation time by 1-bit data. The value "0" indicates that the time is not an evaluation time, while the value "1" indicates that the time is an evaluation time.

Further, in the exemplary model data illustrated in FIG. 16, exemplary model posture data is associated with each time. The exemplary model posture data is data indicating the exemplary model posture that is supposed to be adopted by the player P at the time. For example, the exemplary model posture data is data indicating where representative body parts (for example, head P1, left wrist P2, right wrist P3, waist P4, left ankle P5, and right ankle P6) of the player P would be positioned if the player P adopted the exemplary model posture. Note that the position of each body part is expressed by the coordinate value in the XeYeZe coordinate system in the same manner as the posture data illustrated in, for example, FIG. 8.

In the exemplary model data illustrated in FIG. 16, a period in which evaluation times are continuous corresponds to the evaluation period. Further, an exemplary model posture data group associated with the respective times within the evaluation period indicates an exemplary change in posture adopted by the player P in the evaluation period, that is, the exemplary model action that is supposed to be performed by the player P in the evaluation period.

Note that the evaluation time may be indicated by using a time elapsed since the reproduction of the music (or execution of the game) started. Alternatively, the evaluation time may be indicated by using a data amount of the music data that has been reproduced. For example, times at which the data amount of the music data that has been reproduced becomes D1, D2, D3, . . . bytes (where D1, D2, and D3 are numerical values) may be set as the evaluation times.

Further, for example, the storage unit 80 stores game situation data indicating a current situation of the game. For example, the following information is included in the game situation data:

reproduction position information on the music (information indicating a bar number of music currently being reproduced);
reproduction position information on the motion data on the character object 52 (information indicating a frame number of the motion data currently being reproduced);
state information (for example, position) on the character object 52;
state information (for example, position) on the guide objects 56 and 58;
state information (for example, position, line-of-sight direction 66, and angle of view) on the virtual camera 64; and
score information on the player P.

Next, description is given of the posture data acquiring unit 82. The posture data acquiring unit 82 acquires the posture data relating to the posture actually being adopted by the player P. In the case of this embodiment, the posture data acquiring unit 82 acquires the posture data supplied from the player detecting unit 40.

Next, description is given of the first comparison unit 84. The first comparison unit 84 executes a comparison between the posture of the player P and the exemplary model posture by using as comparison subjects the exemplary model posture that is supposed to be adopted by the player P at the evaluation time and the posture of the player P indicated by the posture data acquired by the posture data acquiring unit 82 at a compared time that is set based on the evaluation time.

Note that the "compared time" represents, for example, the evaluation time itself. In the following description, it is assumed that the "compared time" is the evaluation time itself.

However, the "compared time" is not limited to the evaluation time. For example, the "compared time" may be a time later than the evaluation time. For example, in a case where the processing load on the player detecting unit 40 is relatively large, a time (delay time) between a time at which the player P actually adopts a given posture X and a time at which the posture data indicating that the player P has adopted the posture X is supplied from the player detecting unit 40 to the control unit 14 may be relatively large. In such a case, in consideration of the delay time, a time later than the evaluation time by a predetermined time (estimated delay time) may be set as the "compared time".

For example, the first comparison unit 84 calculates a similarity between the exemplary model posture that is supposed to be adopted by the player P at the evaluation time and the posture of the player P indicated by the posture data acquired at the evaluation time (compared time). Details thereof are described later (see Step S111 of FIG. 22).

Further, for example, based on the similarity between the exemplary model posture that is supposed to be adopted by the player P at the evaluation time and the posture of the player P indicated by the posture data acquired at the evaluation time (compared time), the first comparison unit 84 calculates a similarity between the exemplary model action that is supposed to be performed by the player P in the evaluation period including the evaluation time and the action performed by the player P in a compared period that is set based on the evaluation period. Details thereof are described later (see Step S120 of FIG. 23).

Note that the "compared period" represents, for example, the evaluation period itself. The following description is given by assuming that the "compared period" is the evaluation period itself. However, in the same manner as the above-mentioned relationship between the "evaluation time" and the "compared time", the "compared period" is not limited to the evaluation period. For example, the "compared period" may be a period determined by shifting the evaluation period toward the future direction (that is, such a period that a time later than the start time of the evaluation period by a predetermined time is set as a start time, and a time later than the end time of the evaluation period by a predetermined time is set as an end time).

Next, description is given of the second comparison unit 86 and the output control unit 88.

The second comparison unit 86 executes a comparison between the posture of the player P and the exemplary model posture by changing one of the "posture of the player P" and the "exemplary model posture" that are the subjects of the comparison executed by the first comparison unit 84.

For example, the second comparison unit 86 executes a comparison between a different posture from the exemplary model posture that is supposed to be adopted by the player P at the evaluation time and the posture of the player P indicated by the posture data acquired at the compared time.

Here, the "different posture from the exemplary model posture that is supposed to be adopted by the player P at the evaluation time" represents, for example, the exemplary model posture that is supposed to be adopted by the player P at a time before or after the evaluation time. Alternatively, the "different posture from the exemplary model posture that is supposed to be adopted by the player P at the evaluation time" represents, for example, a posture obtained by making a predetermined change to the exemplary model posture that is supposed to be adopted by the player P at the evaluation time. Further, the "posture obtained by making a predetermined change to the exemplary model posture that is supposed to be adopted by the player P at the evaluation time" represents, for example, a posture obtained by left-right reversing the exemplary model posture that is supposed to be adopted by the player P at the evaluation time.

Further, for example, the second comparison unit 86 may execute a comparison between the exemplary model posture that is supposed to be adopted by the player P at the evaluation time and a different posture from the posture of the player P indicated by the posture data acquired at the compared time.

Here, the "different posture from the posture of the player P indicated by the posture data acquired at the compared time" represents, for example, the posture of the player P indicated by the posture data acquired at a time before or after the compared time. Alternatively, the "different posture from the posture of the player P indicated by the posture data acquired at the compared time" represents, for example, a posture obtained by making a predetermined change to the posture of the player P indicated by the posture data acquired at the compared time. Further, the "posture obtained by making a predetermined change to the posture of the player P indicated by the posture data acquired at the compared time" represents, for example, a posture obtained by left-right reversing the posture of the player P indicated by the posture data acquired at the compared time.

The output control unit 88 causes output means to perform an output based on a comparison between a comparison result from the first comparison unit 84 and a comparison result from the second comparison unit 86. Note that the "output means" represents, for example, the display unit 34 or the audio output unit 36, and the "output" includes, for example, the display output and an audio output.

In the case of this embodiment, the output control unit 88 determines the weakness in the dance of the player P by comparing the comparison result from the first comparison unit 84 with the comparison result from the second comparison unit 86. For example, the output control unit 88 determines the following:

whether or not the dance of the player P is falling behind the music;
whether or not the dance of the player P is getting ahead of the music; and
whether or not the player P is dancing in a left-right reversal.

Then, the output control unit 88 causes the output means to perform an output for notifying the player P of the result. For example, the output control unit 88 causes a message indicating the above-mentioned result to be displayed on the game screen (see FIGS. 13 and 14).

Note that instead of displaying the message, the output control unit 88 may display on the game screen an image based on the above-mentioned result. For example, the output control unit 88 may display an image (for example, icon image) indicating the above-mentioned result on the game screen or may display an effect image based on the above-mentioned result on the game screen. Further, the output control unit 88 may cause a display manner (for example, color) of the image (for example, character object 52) displayed on the game screen to be changed based on the above-mentioned result. In addition, the output control unit 88 may cause a voice to be output from the audio output unit 36 based on the above-mentioned result. For example, the output control unit 88 may cause a voice message indicating the above-mentioned result to be output from the audio output unit 36.

Hereinafter, further detailed description is given of operations of the second comparison unit 86 and the output control unit 88. Here, the description is given by taking eight examples.

First, the first example will be described. In the first example, it is determined whether or not the player P is dancing in rhythm (specifically, whether or not the dance of the player P is falling behind the music or whether or not the dance of the player P is getting ahead of the music).

Figure 17:
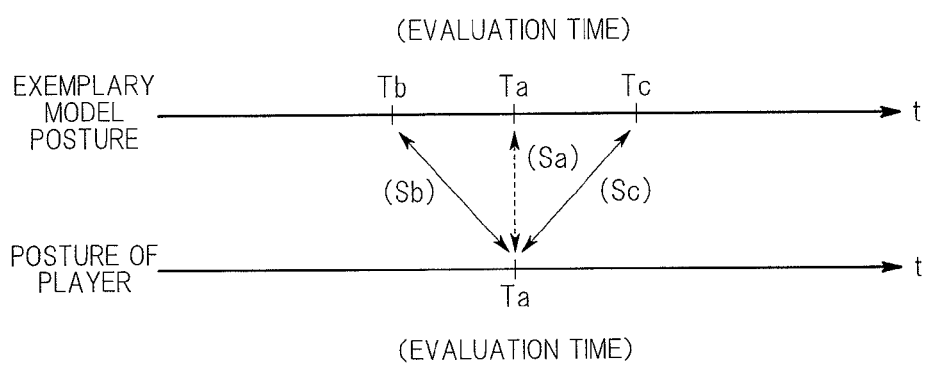
FIG. 17 is an explanatory diagram of an example of operations of a second comparison unit and an output control unit.

FIG. 17 is an explanatory diagram of the first example. In FIG. 17, the t-axis represents a time axis, a time elapsed after the reproduction of the music started (the same applies to FIGS. 18 to 20 described later). Further, in FIG. 17, "Sa" represents the similarity between the exemplary model posture that is supposed to be adopted by the player P at the evaluation time Ta and the posture of the player P indicated by the posture data acquired at the evaluation time Ta. A calculation method for a similarity Sa will be described later (see Step S111 of FIG. 22). Note that the similarity Sa is acquired by the first comparison unit 84.

In the first example, the second comparison unit 86 compares the exemplary model posture that is supposed to be adopted by the player P at a time Tb earlier than the evaluation time Ta by a predetermined time with the posture of the player P indicated by the posture data acquired at the evaluation time Ta. For example, the second comparison unit 86 calculates a similarity Sb between the exemplary model posture at the time Tb and the posture of the player P at the evaluation time Ta. The calculation method for the similarity Sb will be described later (see Step S114 of FIG. 22).

A case where the similarity Sb is higher than the similarity Sa is a case where the posture of the player P at the evaluation time Ta is more similar to the exemplary model posture at the time Tb than to the exemplary model posture at the evaluation time Ta. In such a case, because the time Tb is a time earlier than the evaluation time Ta, it is conceivable that the dance is substantially correct but the movement of the player P is falling behind the music. Therefore, in such a case, the output control unit 88 causes a message indicating that the dance of the player P is falling behind the music to be displayed on the game screen (see FIG. 13).

Further, the second comparison unit 86 compares the exemplary model posture that is supposed to be adopted by the player P at a time Tc later than the evaluation time Ta by a predetermined time with the posture of the player P indicated by the posture data acquired at the evaluation time Ta. For example, the second comparison unit 86 calculates a similarity Sc between the exemplary model posture at the time Tc and the posture of the player P at the evaluation time Ta.

A case where the similarity Sc is higher than the similarity Sa is a case where the posture of the player P at the evaluation time Ta is more similar to the exemplary model posture at the time Tc than to the exemplary model posture at the evaluation time Ta. In such a case, because the time Tc is a time later than the evaluation time Ta, it is conceivable that the dance is substantially correct but the movement of the player P is getting ahead of the music. Therefore, in such a case, the output control unit 88 causes a message indicating that the dance of the player P is getting ahead of the music to be displayed on the game screen.

The second example will be described. In the same manner as the first example, in the second example it is determined whether or not the dance of the player P is falling behind the music or whether or not the dance of the player P is getting ahead of the music. However, the second example is different from the first example in that the posture of the player P at the time before or after the evaluation time is taken into consideration instead of the exemplary model posture at the time before or after the evaluation time.

Figure 18:
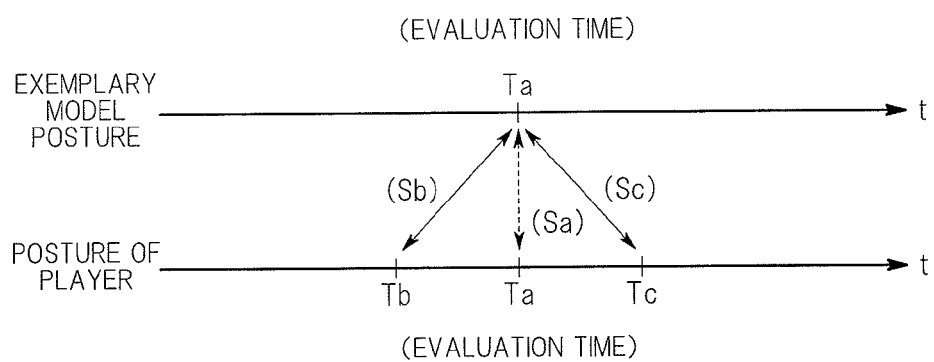
FIG. 18 is an explanatory diagram of another example of the operations of the second comparison unit and the output control unit.

FIG. 18 is an explanatory diagram of the second example. In the same manner as FIG. 17, "Sa" represents the similarity between the exemplary model posture that is supposed to be adopted by the player P at the evaluation time Ta and the posture of the player P indicated by the posture data acquired at the evaluation time Ta. Note that the similarity Sa is acquired by the first comparison unit 84.

In the second example, the second comparison unit 86 compares the exemplary model posture that is supposed to be adopted by the player P at the evaluation time Ta with the posture of the player P indicated by the posture data acquired at a time Tb earlier than the evaluation time Ta by a predetermined time. For example, the second comparison unit 86 calculates a similarity Sb between the exemplary model posture at the evaluation time Ta and the posture of the player P at the time Tb. The calculation method for the similarity Sb will be described later (see Step S115 of FIG. 22).

A case where the similarity Sb is higher than the similarity Sa is a case where the exemplary model posture at the evaluation time Ta is more similar to the posture of the player P at the time Tb than to the posture of the player P at the evaluation time Ta. In such a case, because the evaluation time Ta is a time later than the time Tb, it is conceivable that the dance is substantially correct but the movement of the player P is getting ahead of the music. Therefore, in such a case, the output control unit 88 causes a message indicating that the dance of the player P is getting ahead of the music to be displayed on the game screen.

Further, the second comparison unit 86 compares the exemplary model posture that is supposed to be adopted by the player P at the evaluation time Ta with the posture of the player P indicated by the posture data acquired at a time Tc later than the evaluation time Ta by a predetermined time. For example, the second comparison unit 86 calculates a similarity Sc between the exemplary model posture at the evaluation time Ta and the posture of the player P at the time Tc.

A case where the similarity Sc is higher than the similarity Sa is a case where the exemplary model posture at the evaluation time Ta is more similar to the posture of the player P at the time Tc than to the posture of the player P at the evaluation time Ta. In such a case, because the evaluation time Ta is a time earlier than the time Tc, it is conceivable that the dance is substantially correct but the movement of the player P is falling behind the music. Therefore, in such a case, the output control unit 88 causes a message indicating that the dance of the player P is falling behind the music to be displayed on the game screen (see FIG. 13).

The third example will be described. In the same manner as the first and the second examples, in the third example it is determined whether or not the dance of the player P is falling behind the music or whether or not the dance of the player P is getting ahead of the music. However, the third example is different from the first and second examples in that the above-mentioned determination is performed by focusing on a plurality of times instead of focusing on only one time.

FIG. 19 is an explanatory diagram of the third example. In FIG. 19, "Sa" represents the similarity between the exemplary model action that is supposed to be performed by the player P in an evaluation period La and the action performed by the player P in the evaluation period La.

The similarity Sa is acquired by comparing the exemplary model postures at respective times T2, T3, T4, and T5 within the evaluation period La with the posture of the player P at respective times T2, T3, T4, and T5 within the evaluation period La. The calculation method for the similarity Sa will be described later (see Step S120 of FIG. 23). The similarity Sa is acquired by the first comparison unit 84.

Further, in FIG. 19, a period Lb represents a period determined by shifting the evaluation period La toward the past direction (negative t-axis direction). Note that the evaluation period La and the period Lb has the same duration. Further, the start time T1 in the period Lb is a time earlier than the start time T2 in the evaluation period La, and the end time T4 in the period Lb is a time earlier than the end time T5 in the evaluation period La.

In the third example, the second comparison unit 86 compares the exemplary model action that is supposed to be performed by the player P in the period Lb with the action performed by the player P in the evaluation period La. For example, the second comparison unit 86 calculates the similarity Sb between the exemplary model action in the period Lb and the action of the player P in the evaluation period La.

The similarity Sb is acquired by comparing the exemplary model postures at respective times T1, T2, T3, and T4 within the period Lb with the posture of the player P at respective times T2, T3, T4, and T5 within the evaluation period La. The calculation method for the similarity Sb will be described later (see Step S123 of FIG. 23).

A case where the similarity Sb is higher than the similarity Sa is a case where the action of the player P at the evaluation period La is more similar to the exemplary model action in the period Lb than to the exemplary model action in the evaluation period La. In such a case, because the period Lb is a time earlier than the evaluation period La, it is conceivable that the dance is substantially correct but the movement of the player P is falling behind the music. Therefore, in such a case, the output control unit 88 causes a message indicating that the dance of the player P is falling behind the music to be displayed on the game screen (see FIG. 13).

Note that in the same manner, the second comparison unit 86 may compare the exemplary model action that is supposed to be performed by the player P in a period Lc (not shown) determined by shifting the evaluation period La toward the future direction (positive t-axis direction) with the action performed by the player P in the evaluation period La. For example, the second comparison unit 86 may calculate the similarity Sc between the exemplary model action in the period Lc and the action of the player P in the evaluation period La.

A case where the similarity Sc is higher than the similarity Sa is a case where the action of the player P in the evaluation period La is more similar to the exemplary model action in the period Lc than to the exemplary model action in the evaluation period La. In such a case, because the period Lc is a period later than the evaluation period La, it is conceivable that the dance is substantially correct but the movement of the player P is getting ahead of the music. Therefore, in such a case, the output control unit 88 may cause a message indicating that the dance of the player P is getting ahead of the music to be displayed on the game screen (see FIG. 13).

The fourth example will be described. In the fourth example, it is determined whether or not the dance of the player P is falling behind the music or whether or not the dance of the player P is getting ahead of the music. The fourth example is similar to the third example in that the above-mentioned determination is performed by focusing on a plurality of times instead of focusing on only one time. However, the fourth example is different from the third example in that the posture (action) of the player P at the time before or after the evaluation period is taken into consideration instead of the exemplary model posture (exemplary model action) at the time before or after the evaluation time.

FIG. 20 is an explanatory diagram of the fourth example. In the same manner as FIG. 19, "Sa" represents the similarity between the exemplary model action that is supposed to be performed by the player P in an evaluation period La and the action performed by the player P in the evaluation period La. Further, in the same manner as FIG. 19, a period Lb represents a period determined by shifting the evaluation period La toward the past direction (negative t-axis direction).

In the fourth example, the second comparison unit 86 compares the exemplary model action that is supposed to be performed by the player P in the evaluation period La with the action performed by the player P in the period Lb. For example, the second comparison unit 86 calculates the similarity Sb between the exemplary model action in the evaluation period La and the action of the player P in the period Lb.

The similarity Sb is acquired by comparing the exemplary model postures at respective times T2, T3, T4, and T5 within the evaluation period La with the posture of the player P at respective times T1, T2, T3, and T4 within the period Lb. The calculation method for the similarity Sb will be described later (see Step S124 of FIG. 23).

A case where the similarity Sb is higher than the similarity Sa is a case where the exemplary model action in the evaluation period La is more similar to the action of the player P in the period Lb than to the action of the player P in the evaluation period La. In such a case, because the evaluation period La is a period later than the period Lb, it is conceivable that the dance is substantially correct but the movement of the player P is getting ahead of the music. Therefore, in such a case, the output control unit 88 causes a message indicating that the dance of the player P is getting ahead of the music to be displayed on the game screen.

Note that in the same manner, the second comparison unit 86 may compare the exemplary model action that is supposed to be performed by the player P in the evaluation period La with the action performed by the player P in the period Lc (not shown) determined by shifting the evaluation period La toward the future direction (positive t-axis direction). For example, the second comparison unit 86 may calculate the similarity Sc between the exemplary model action in the evaluation period La and the action of the player P in the period Lc.

A case where the similarity Sc is higher than the similarity Sa is a case where the exemplary model action in the evaluation period La is more similar to the action of the player P in the period Lc than to the action of the player P in the evaluation period La. In such a case, because the evaluation period La is a period earlier than the period Lc, it is conceivable that the dance is substantially correct but the movement of the player P is falling behind the music. Therefore, in such a case, the output control unit 88 may cause a message indicating that the dance of the player P is falling behind the music to be displayed on the game screen (see FIG. 13).

The fifth example will be described. In the fifth example, unlike the first to fourth examples, it is determined whether or not the dance of the player P is left-right reversed.

In the fifth example, the second comparison unit 86 compares a posture obtained by changing the exemplary model posture that is supposed to be adopted by the player P at an evaluation time with the posture of the player P indicated by the posture data acquired at the evaluation time (compared time).

For example, the second comparison unit 86 calculates the similarity between the posture obtained by left-right reversing the exemplary model posture that is supposed to be adopted by the player P at the evaluation time and the posture of the player P indicated by the posture data acquired at the evaluation time. The calculation method for the similarity will be described later (see Step S116 of FIG. 22). Note that in this case, the posture obtained by left-right reversing the exemplary model posture corresponds to the "posture obtained by changing the exemplary model posture".

A case where the above-mentioned similarity is higher than the similarity (Sa of FIG. 17) calculated by the first comparison unit 84 is a case where the posture of the player P is more similar to the posture obtained by left-right reversing the exemplary model posture than to the exemplary model posture. In this case, it is conceivable that the dance is being performed in time with the music but the player P is dancing in a left-right reversal. Therefore, in such a case, the output control unit 88 causes a message indicating that the player P is dancing in a left-right reversal to be displayed on the game screen (see FIG. 14).

The sixth example will be described. In the same manner as the fifth example, in the sixth example it is determined whether or not the dance of the player P is left-right reversed. However, the sixth example is different from the fifth example in that the posture of the player P is left-right reversed instead of the exemplary model posture.

In the sixth example, the second comparison unit 86 compares the exemplary model posture that is supposed to be adopted by the player P at the evaluation time with a posture obtained by changing the posture of the player P indicated by the posture data acquired at the evaluation time (compared time).

For example, the second comparison unit 86 calculates the similarity between the exemplary model posture that is supposed to be adopted by the player P at the evaluation time and the posture obtained by left-right reversing the posture of the player P indicated by the posture data acquired at the evaluation time. In this case, the posture obtained by left-right reversing the posture of the player P corresponds to the "posture obtained by changing the posture of the player P".

A case where the above-mentioned similarity is higher than the similarity (Sa of FIG. 17) calculated by the first comparison unit 84 is a case where the exemplary model posture is more similar to the posture obtained by left-right reversing the exemplary model posture of the player P than to the posture of the player P. In this case, it is conceivable that the dance is being performed in time with the music but the player P is dancing in a left-right reversal. Therefore, in such a case, the output control unit 88 causes a message indicating that the player P is dancing in a left-right reversal to be displayed on the game screen (see FIG. 14).

The seventh example will be described. In the same manner as the fifth and sixth examples, in the seventh example it is determined whether or not the dance of the player P is left-right reversed. However, the seventh example is different from the fifth and sixth examples in that the above-mentioned determination is performed by focusing on a plurality of times instead of focusing on only one time.

In the seventh example, the second comparison unit 86 compares the action obtained by changing the exemplary model action that is supposed to be performed by the player P in the evaluation period with the action performed by the player P in the evaluation period.

For example, the second comparison unit 86 calculates the similarity between the action obtained by left-right reversing the exemplary model action in the evaluation period and the action of the player P in the evaluation period. The calculation method for the similarity will be described later (see Step S125 of FIG. 23).

Note that in this case, the action obtained by left-right reversing the exemplary model action corresponds to the "action obtained by changing the exemplary model action". The action obtained by left-right reversing the exemplary model action in the evaluation period may be obtained by, for example, left-right reversing the exemplary model postures at all times within the evaluation period.

A case where the above-mentioned similarity is higher than the similarity (Sa of FIG. 17) calculated by the first comparison unit 84 is a case where the action of the player P is more similar to the action obtained by left-right reversing the exemplary model action than to the exemplary model action. In this case, it is conceivable that the dance is being performed in time with the music but the player P is dancing in a left-right reversal. Therefore, in such a case, the output control unit 88 causes a message indicating that the player P is dancing in a left-right reversal to be displayed on the game screen (see FIG. 14).

The eighth example will be described. In the same manner as the seventh example, in the eighth example it is determined whether or not the dance of the player P is left-right reversed. However, the eighth example is different from the seventh example in that the action of the player P is left-right reversed instead of the exemplary model action.

In the eighth example, the second comparison unit 86 compares the exemplary model action that is supposed to be performed by the player P in the evaluation period with an action obtained by changing the action performed by the player P in the evaluation period.

For example, the second comparison unit 86 calculates the similarity between the exemplary model action in the evaluation period and the action obtained by left-right reversing the action of the player P in the evaluation period. In this case, the action obtained by left-right reversing the action of the player P corresponds to the "action obtained by changing the action of the player P". The action obtained by left-right reversing the action of the player P in the evaluation period may be obtained by, for example, left-right reversing the postures of the player P at all times within the evaluation period.

A case where the above-mentioned similarity is higher than the similarity (Sa of FIG. 17) calculated by the first comparison unit 84 is a case where the exemplary model action is more similar to the action obtained by left-right reversing the action performed by the player P than to the action actually performed by the player P. In this case, it is conceivable that the dance is being performed in time with the music but the player P is dancing in a left-right reversal. Therefore, in such a case, the output control unit 88 causes a message indicating that the player P is dancing in a left-right reversal to be displayed on the game screen (see FIG. 14).

Figure 22:
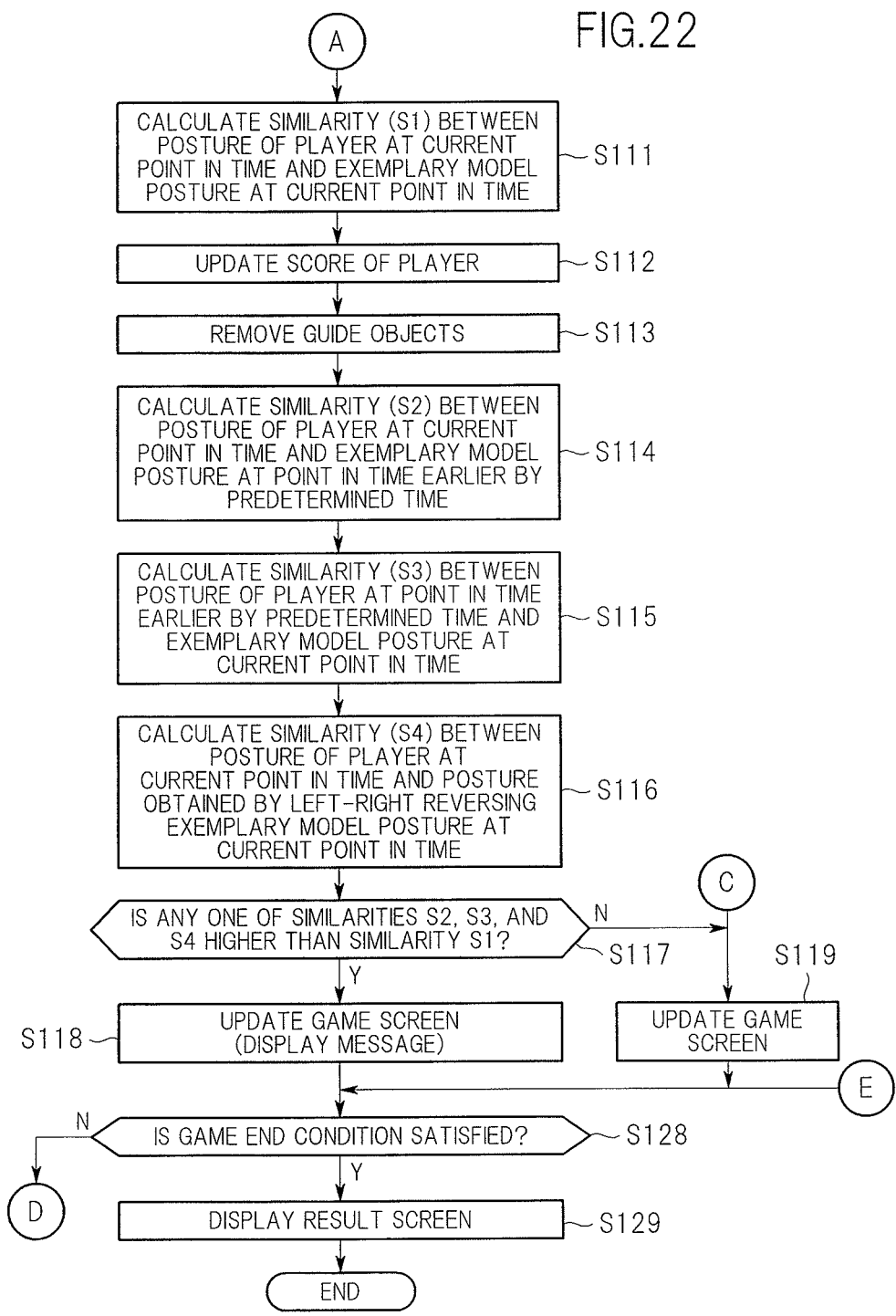
FIG. 22 is a flowchart illustrating the example of the processing executed by the game device.

Next, description is given of processing executed by the game devise 10 in order to realize the above-mentioned assist function. FIGS. 21, 22, and 23 are flowcharts illustrating an example of processing relating to the above-mentioned assist function among processing executed by the game device 10 from the start of the game until the end of the game. In a case where the control unit 14 executes the processing illustrated in FIGS. 21 to 23 according to the program read from the optical disc 38, the control unit 14 functions as the posture data acquiring unit 82, the first comparison unit 84, the second comparison unit 86, and the output control unit 88.

As illustrated in FIG. 21, first, the control unit 14 displays the game screen in an initial state on the display unit 34 (S101). On the game screen in the initial state, the posture of the character object 52 is set to a predetermined initial posture (for example, upright posture).

Further, the control unit 14 starts to reproduce the music (S102). After that, the control unit 14 repeatedly executes the processing of Steps S103 to S127 every predetermined time (frame rate: for example, $\frac{1}{60}^{th}$ of a second).

First, the control unit 14 (posture data acquiring unit 82) acquires the posture data on the player P supplied from the player detecting unit 40, and causes the storage unit 82 to store the posture data (S103). The storage unit 80 stores a history of the posture data on the player P in chronological order.

After that, the control unit 14 updates the posture of the character object 52 based on the motion data (S104). That is, the control unit 14 sets the posture of the character object 52 to the posture for the current frame indicated by the motion data.

After that, the control unit 14 determines whether or not the time left until the single evaluation time or the start time of the evaluation period arrives has reached a predetermined time (S105). Note that the "single evaluation time" means the evaluation time that is not continuous. Further, the "predetermined time" is a time corresponding to, for example, n bars (for example, 2 bars) of the music.

If it is determined that the time left until the single evaluation time or the start time of the evaluation period arrives has reached the predetermined time, the control unit 14 locates the guide objects 56 and 58 in the virtual space 60 (S106).

For example, if it is determined in Step S105 that the time left until the single evaluation time arrives has reached the predetermined time, the guide objects 56 are located in the virtual space 60. The posture of the guide objects 56 is set to the posture of the character object 52 at the evaluation time based on the motion data on the character object 52. Further, the guide objects 56 are set in a predetermined color (for example, green) and set to be translucent. On the other hand, if it is determined in Step S105 that the time left until the start time of the evaluation period arrives has reached the predetermined time, the guide object 58 is located in the virtual space 60.

If it is not determined in Step S105 that the time left until the single evaluation time or the start time of the evaluation period arrives has reached the predetermined time, or if the processing of Step S106 is executed, the control unit 14 determines whether or not the guide objects 56 and 58 are located in the virtual space 60 (S107). If the guide objects 56 and 58 are located in the virtual space 60, the control unit 14 updates the states of the guide objects 56 and 58 (S108).

For example, if the guide objects 56 are located in the virtual space 60, the control unit 14 causes the guide objects 56 to move toward the character object 52. The guide objects 56 are controlled so as to reach the character object 52 at the evaluation time.

On the other hand, if the guide object 58 is located in the virtual space 60, the control unit 14 controls the guide object 58 so that the color of the guide object 58 gradually changes from the beginning edge toward the end edge in the evaluation period in synchronization with the movement of the body part of the character object 52.

If it is determined in Step S107 that the guide objects 56 and 58 are not located in the virtual space 60, or if the processing of Step S108 is executed, the control unit 14 determines whether or not the single evaluation time has arrived (S109). If it is determined that the single evaluation time has arrived, as illustrated in FIG. 22, the control unit 14 (first comparison unit 84) calculates a similarity S1 between the posture of the player P at the current point in time and the exemplary model posture at the current point in time (S111).

For example, the control unit 14 acquires the exemplary model posture data corresponding to the current point in time from the exemplary model data. Then, the control unit 14 calculates the similarity between the posture data acquired in Step S103 and the exemplary model posture data.

For example, for each of a plurality of representative body parts (for example, head P1, left wrist P2, right wrist P3, waist P4, left ankle P5, and right ankle P6) of the player P, the control unit 14 determines whether or not a distance between the position of the body part indicated by the posture data and the position of the body part indicated by the exemplary model posture data is less than a reference distance.

For example, if the representative body parts are the "head P1, left wrist P2, right wrist P3, waist P4, left ankle P5, and right ankle P6", the control unit 14 determines whether or not the distance between the position of the head P1 indicated by the posture data and the position of the head P1 indicated by the exemplary model posture data is less than the reference distance. The control unit 14 also executes the same determination on each of the left wrist P2, the right wrist P3, the waist P4, the left ankle P5, and the right ankle P6.

Then, the control unit 14 calculates the above-mentioned similarity based on the number of body parts for which it has been determined that the above-mentioned distance is less than the reference distance. For example, assuming that the total number of representative body parts is M and the number of body parts for which it has been determined that the above-mentioned distance is less than the reference distance is m, the above-mentioned similarity S1 is calculated by the following expression (1).

$$S1 = m/M \quad (1)$$

For example, if the representative body parts are the "head P1, left wrist P2, right wrist P3, waist P4, left ankle P5, and right ankle P6", and if the body parts for which it has been determined that the above-mentioned distance is less than the reference distance are the "left wrist P2, waist P4, and right ankle P6", 0.5 is calculated as the similarity S1. Note that the calculation method for the similarity S1 is not limited to the method described here. For example, the number (m) of body parts for which it has been determined that the above-mentioned distance is less than the reference distance may be acquired as the similarity S1.

After the processing of Step S111 is executed, the control unit 14 updates the score of the player P (S112), and removes the guide objects 56 from the virtual space 60 (S113). In Step S112, for example, if the similarity S1 acquired in Step S111 is higher than a reference value, the score of the player P is increased.

After the processing of Step S113 is executed, the control unit 14 (second comparison unit 86) calculates a similarity S2 between the posture of the player P at the current point in time and the exemplary model posture at a point in time earlier than the current point in time by a predetermined time (S114). For example, the control unit 14 acquires the exemplary model posture data corresponding to the point in time earlier by the predetermined time from the exemplary model data. Then, the control unit 14 calculates the similarity S2 between the posture data acquired in Step S103 and the exemplary model posture data corresponding to the point in time earlier by the predetermined time. The similarity S2 is calculated by the same method as the method of calculating the similarity S1 in Step S111.

After the processing of Step S114 is executed, the control unit 14 (second comparison unit 86) calculates a similarity S3 between the posture of the player P at a point in time earlier than the current point in time by the predetermined time and the exemplary model posture at the current point in time (S115). For example, the control unit 14 acquires the posture data acquired at the point in time earlier by the predetermined time from the storage unit 80. Further, the control unit 14 acquires the exemplary model posture data corresponding to the current point in time from the exemplary model data. Then, the control unit 14 calculates the similarity S3 between the posture data and the exemplary model posture data. The similarity S3 is calculated by the same method as the method of calculating the similarity S1 in Step S111.

After the processing of Step S115 is executed, the control unit 14 (second comparison unit 86) calculates a similarity S4 between the posture of the player P at the current point in time and the posture obtained by left-right reversing the exemplary model posture at the current point in time (S116). For example, the control unit 14 acquires the exemplary model posture data corresponding to the current point in time from the exemplary model data, and based on the exemplary model posture data, generates the left-right reversed posture data indicating the posture obtained by left-right reversing the exemplary model posture. The control unit 14 calculates the similarity S4 between the posture data acquired in Step S103 and the left-right reversed posture data. The similarity S4 is calculated by the same method as the method of calculating the similarity S1 in Step S111.

After the processing of Step S116 is executed, the control unit 14 (output control unit 88) determines whether or not any one of the similarities S2 to S4 calculated in Steps S114 to S116, respectively, is higher than the similarity S1 calculated in Step S111 (S117).

If it is determined that any one of the similarities S2 to S4 is higher than the similarity S1, the control unit 14 (output control unit 88) updates the game screen in the following manner (S118). For example, the control unit 14 generates an image indicating the virtual space 60 viewed from the virtual camera 64 in the VRAM. Further, the control unit 14 draws the score 50 of the player P at a predetermined position within the image generated in the VRAM. In addition, the control unit 14 draws a message based on the result of the comparison between the similarities S2 to S4 and the similarity S1 at a predetermined position within the image generated in the VRAM.

For example, if the similarity S2 is higher than the similarity S1, the control unit 14 determines that the dance of the player P is falling behind the music, and draws a message to that effect (for example, message 70 of FIG. 13). Further, for example, if the similarity S3 is higher than the similarity S1, the control unit 14 determines that the dance of the player P is getting ahead of the music, and draws a message to that effect. Further, for example, if the similarity S4 is higher than the similarity S1, the control unit 14 determines that the dance of the player P is left-right reversed, and draws a message to that effect (for example, message 72 of FIG. 14).

The image generated in the VRAM as described above is displayed on the display unit 34 as the game screen. In this case, the message indicating the weakness in the dance of the player P is displayed on the game screen (see FIGS. 13 and 14). Note that the message may be displayed on the game screen over a fixed period of time.

Incidentally, if a plurality of similarities of the similarities S2 to S4 are higher than the similarity S1, it may be determined that the weakness in the dance of the player P cannot be identified. As a result, the message may not be drawn. Alternatively, the message corresponding to the highest similarity among the above-mentioned plurality of similarities may be drawn.

On the other hand, if it is determined in Step S117 that none of the similarities S2 to S4 is higher than the similarity S1, the control unit 14 updates the game screen in the following manner (S119). For example, the control unit 14 generates the image indicating the virtual space 60 viewed from the virtual camera 64 in the VRAM. Further, the control unit 14 draws the score 50 of the player P in the predetermined position within the image generated in the VRAM. The image thus generated in the VRAM is displayed on the display unit 34 as the game screen.

If it is determined in Step S109 of FIG. 21 that the single evaluation time has not arrived, the control unit 14 determines whether or not the end time of the evaluation period has arrived (S110). If it is determined that the end time of the evaluation period has not arrived, the control unit 14 updates the game screen (S119). The processing of Step S119 has already been described, and hence the description thereof is omitted here.

On the other hand, if it is determined that the end time of the evaluation period has arrived, as illustrated in FIG. 23, the control unit 14 (first comparison unit 84) calculates a similarity S5 between the action of the player P in the evaluation period and the exemplary model action in the evaluation period (S120).

Here, the processing of Step S120 will be described with reference to FIG. 19. For example, the control unit 14 acquires from the storage unit 80 the posture data acquired at the individual times T2, T3, T4, and T5 within the evaluation period La. Further, the control unit 14 acquires from the exemplary model data the exemplary model posture data corresponding to the individual times T2, T3, T4, and T5 within the evaluation period La.

Then, the control unit 14 calculates the similarities at the individual times T2, T3, T4, and T5 within the evaluation period La. For example, as the similarity at the time T2, the control unit 14 calculates the similarity between the posture data acquired at the time T2 and the exemplary model posture data corresponding to the time T2. The similarity is calculated by the same method as the method of calculating the similarity S1 in Step S111. In the same manner, the control unit 14 calculates the similarities at the respective times T3, T4, and T5. Then, the control unit 14 calculates statistics (for example, average value) of the similarities at the individual times T2, T3, T4, and T5 within the evaluation period La, and acquires the statistics as the above-mentioned similarity S5.

After the processing of Step S120 is executed, the control unit 14 updates the score of the player P (S121), and removes the guide object 58 from the virtual space 60 (S122). In Step S121, for example, if the similarity S5 acquired in Step S120 is higher than a reference value, the score of the player P is increased.

After the processing of Step S122 is executed, the control unit 14 (second comparison unit 86) calculates a similarity S6 between the action performed by the player P in the evaluation period and the exemplary model action that is supposed to be performed by the player P in the period (past period, for example, period Lb of FIG. 19) determined by shifting the evaluation period toward the past direction (S123).

Here, also by referring to FIG. 19, the processing of Step S123 will be described. For example, the control unit 14 acquires from the storage unit 80 the posture data acquired at the individual times T2, T3, T4, and T5 within the evaluation period La. Further, the control unit 14 acquires from the exemplary model data the exemplary model posture data corresponding to the individual times T1, T2, T3, and T4 within the period Lb (past period).

Then, the control unit 14 calculates the similarities relating to the individual times T2, T3, T4, and T5 within the evaluation period La. For example, as the similarity relating to the time T2, the control unit 14 calculates the similarity between the posture data acquired at the time T2 and the exemplary model posture data at the time T1 within the period Lb corresponding to the time T2. The similarity is calculated by the same method as the method of calculating the similarity S1 in Step S111.

In the same manner, the control unit 14 calculates the similarities at the respective times T3, T4, and T5. Then, the control unit 14 calculates the statistics (for example, average value) of the similarities relating to the individual times T2, T3, T4, and T5 within the evaluation period La, and acquires the statistics as the above-mentioned similarity S6.

After the processing of Step S123 is executed, the control unit 14 (second comparison unit 86) calculates a similarity S7 between the action performed by the player P in the period (past period, for example, period Lb of FIG. 20) determined by shifting the evaluation period toward the past direction and the exemplary model action that is supposed to be performed by the player P in the evaluation period (S124).

Here, by referring to FIG. 20, the processing of Step S124 will be described. For example, the control unit 14 acquires from the exemplary model data the exemplary model posture data corresponding to the individual times T2, T3, T4, and T5 within the evaluation period La. Further, the control unit 14 acquires from the storage unit 80 the posture data acquired at the individual times T1, T2, T3, and T4 within the period Lb (past period).

Then, the control unit 14 calculates the similarities relating to the individual times T2, T3, T4, and T5 within the evaluation period La. For example, as the similarity relating to the time T2, the control unit 14 calculates the similarity between the exemplary model posture data corresponding to the time T2 and the posture data acquired at the time T1 within the period Lb corresponding to the time T2. The similarity is calculated by the same method as the method of calculating the similarity S1 in Step S111.

In the same manner, the control unit 14 calculates the similarities at the respective times T3, T4, and T5. Then, the control unit 14 calculates the statistics (for example, average value) of the similarities relating to the individual times T2, T3, T4, and T5 within the evaluation period La, and acquires the statistics as the above-mentioned similarity S7.

After the processing of Step S124 is executed, the control unit 14 (second comparison unit 86) calculates a similarity S8 between the action performed by the player P in the evaluation period and the action obtained by left-right reversing the exemplary model action that is supposed to be performed by the player P in the evaluation period (S125).

Here, the processing of Step S125 will be described with reference to FIG. 19. For example, the control unit 14 acquires from the storage unit 80 the posture data acquired at the individual times T2, T3, T4, and T5 within the evaluation period La. Further, the control unit 14 acquires from the exemplary model data the exemplary model posture data corresponding to the individual times T2, T3, T4, and T5 within the evaluation period La.

Then, the control unit 14 generates the left-right reversed posture data corresponding to the individual times T2, T3, T4, and T5 within the evaluation period La. For example, the control unit 14 generates the left-right reversed posture data corresponding to the time T2 by left-right reversing the exemplary model posture indicated by the exemplary model posture data corresponding to the time T2. In the same manner, the control unit 14 generates the left-right reversed posture data corresponding to the individual times T3, T4, and T5.

Then, the control unit 14 calculates the similarities relating to the individual times T2, T3, T4, and T5 within the evaluation period La. For example, as the similarity relating to the time T2, the control unit 14 calculates the similarity between the left-right reversed posture data corresponding to the time T2 and the posture data acquired at the time T2. The similarity is calculated by the same method as the method of calculating the similarity S1 in Step S111.

In the same manner, the control unit 14 calculates the similarities at the respective times T3, T4, and T5. Then, the control unit 14 calculates the statistics (for example, average value) of the similarities relating to the individual times T2, T3, T4, and T5 within the evaluation period La, and acquires the statistics as the above-mentioned similarity S8.

After the processing of Step S125 is executed, the control unit 14 (output control unit 88) determines whether or not any one of the similarities S6 to S8 calculated in Steps S123 to S125, respectively, is higher than the similarity S5 calculated in Step S120 (S126).

If it is determined that any one of the similarities S6 to S8 is higher than the similarity S5, the control unit 14 (output control unit 88) updates the game screen in the following manner (S127). For example, the control unit 14 generates an image indicating the virtual space 60 viewed from the virtual camera 64 in the VRAM. Further, the control unit 14 draws the score 50 of the player P at a predetermined position within the image generated in the VRAM. In addition, the control unit 14 draws a message based on the result of the comparison between the similarities S6 to S8 and the similarity S5 at a predetermined position within the image generated in the VRAM.

For example, if the similarity S6 is higher than the similarity S5, the control unit 14 determines that the dance of the player P is falling behind the music, and draws a message to that effect (for example, message 70 of FIG. 13). Further, for example, if the similarity S7 is higher than the similarity S5, the control unit 14 determines that the dance of the player P is getting ahead of the music, and draws a message to that effect. Further, for example, if the similarity S8 is higher than the similarity S5, the control unit 14 determines that the dance of the player P is left-right reversed, and draws a message to that effect (for example, message 72 of FIG. 14).

The image generated in the VRAM as described above is displayed on the display unit 34 as the game screen. In this case, the message indicating the weakness in the dance of the player P is displayed on the game screen (see FIGS. 13 and 14). Note that the message may be displayed on the game screen over a fixed period of time.

Incidentally, if a plurality of similarities of the similarities S6 to S8 are higher than the similarity S5, it may be determined that the weakness in the dance of the player P cannot be identified. As a result, the message may not be drawn. Alternatively, the message corresponding to the highest similarity among the above-mentioned plurality of similarities may be drawn.

On the other hand, if it is determined in Step S126 that none of the similarities S6 to S8 is higher than the similarity S5, the control unit 14 updates the game screen (S119). The processing of Step S119 has already been described, and hence the description thereof is omitted here.

After the processing of Step S118, S119, or S127 is executed, as illustrated in FIG. 22, the control unit 14 determines whether or not a game end condition is satisfied (S128). The "game end condition" is a condition such as whether or not, for example, the reproduction of the music is completed.

That is, if the reproduction of the music is completed, the control unit 14 determines that the game end condition is satisfied. Note that the "game end condition" is not limited to the above-mentioned condition. For example, the "game end condition" may be a condition such as whether or not the score of the player P is less than reference points.

If it is not determined that the game end condition is satisfied, the control unit 14 again executes the processing of Steps S103 to S127. Until it is determined that the game end condition is satisfied, the processing of Steps S103 to S127 is repeatedly executed every predetermined time (frame rate: for example, $\frac{1}{60}^{th}$ of a second).

On the other hand, if it is determined that the game end condition is satisfied, the control unit 14 causes a result screen to be displayed on the display unit 34 (S129). The result screen is a screen indicating game play results of the player P, and the score (game results) of the player P is displayed on the result screen. After the result screen is displayed, this processing is brought to an end, and the game ends.

The game device 10 described above is configured to perform an output for notifying the player P of their weakness in a specific manner if the player P is not dancing well (see FIGS. 13 and 14). According to the game device 10, it is possible to assist the player P in grasping any weakness in their dance in detail.

Note that the present invention is not limited to the embodiment described above.

The present invention can also be applied to a game other than the game configured so that the player P aims to perform a predetermined dance in time with the music. The present invention can be applied to a game configured so that the player P aims to adopt a predetermined exemplary model posture at a reference time.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device, which executes a game configured so that a player aims to adopt an exemplary model posture at a reference time, comprising:
    means for acquiring data stored in means for storing the data, the data relating to the exemplary model posture that is supposed to be adopted by the player in the game;
    posture data acquiring means for acquiring posture data relating to a posture adopted by the player;
    a first comparison means for executing a comparison between the exemplary model posture that is supposed to be adopted by the player at the reference time and the posture of the player indicated by the posture data acquired at a compared time that is set based on the reference time;
    a second comparison means for executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and
    output control means for causing output means to perform an output based on a comparison between a comparison result from the first comparison means and a comparison result from the second comparison means, the second comparison means comprising at least one of:

means for executing a comparison between the exemplary model posture that is supposed to be adopted by the player at one of a time before the reference time and a time after the reference time and the posture of the player indicated by the posture data acquired at the compared time;

means for executing a comparison between a posture obtained by making a predetermined change to the exemplary model posture that is supposed to be adopted by the player at the reference time and the posture of the player indicated by the posture data acquired at the compared time;

means for executing a comparison between the exemplary model posture that is supposed to be adopted by the player at the reference time and the posture of the player indicated by the posture data acquired at one of a time before the compared time and a time after the compared time; and means for executing a comparison between the exemplary model posture that is supposed to be adopted by the player at the reference time and a posture obtained by making a predetermined change to the posture of the player indicated by the posture data acquired at the compared time.

2. The game device according to claim 1, wherein:

the posture obtained by making the predetermined change to the exemplary model posture that is supposed to be adopted by the player at the reference time comprises a posture obtained by left-right reversing the exemplary model posture that is supposed to be adopted by the player at the reference time; and the second comparison means comprises means for executing a comparison between the posture obtained by left-right reversing the exemplary model posture that is supposed to be adopted by the player at the reference time and the posture of the player indicated by the posture data acquired at the compared time.

3. The game device according to claim 1, wherein:

the posture obtained by making the predetermined change to the posture of the player indicated by the posture data acquired at the compared time comprises a posture obtained by left-right reversing the posture of the player indicated by the posture data acquired at the compared time; and the second comparison means comprises means for executing a comparison between the exemplary model posture that is supposed to be adopted by the player at the reference time and the posture obtained by left-right reversing the posture of the player indicated by the posture data acquired at the compared time.

4. A control method for a game device, which executes a game configured so that a player aims to adopt an exemplary model posture at a reference time, comprising:

a step of acquiring data stored in means for storing the data, the data relating to the exemplary model posture that is supposed to be adopted by the player in the game;

a posture data acquiring step of acquiring posture data relating to a posture adopted by the player;

a first comparison step of executing a comparison between the exemplary model posture that is supposed to be adopted by the player at the reference time and the posture of the player indicated by the posture data acquired at a compared time that is set based on the reference time;

a second comparison step of executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and an output control step of causing output means to perform an output based on a comparison between a comparison result from the first comparison step and a comparison result from the second comparison step, the second comparison step comprising at least one of:

executing a comparison between the exemplary model posture that is supposed to be adopted by the player at one of a time before the reference time and a time after the reference time and the posture of the player indicated by the posture data acquired at the compared time;

executing a comparison between a posture obtained by making a predetermined change to the exemplary model posture that is supposed to be adopted by the player at the reference time and the posture of the player indicated by the posture data acquired at the compared time;

executing a comparison between the exemplary model posture that is supposed to be adopted by the player at the reference time and the posture of the player indicated by the posture data acquired at one of a time before the compared time and a time after the compared time; and executing a comparison between the exemplary model posture that is supposed to be adopted by the player at the reference time and a posture obtained by making a predetermined change to the posture of the player indicated by the posture data acquired at the compared time.

5. A non-transitory computer readable information storage medium storing a program for causing a computer to function as a game device, which executes a game configured so that a player aims to adopt an exemplary model posture at a reference time, the program further causing the computer to function as:

means for acquiring data stored in means for storing the data, the data relating to the exemplary model posture that is supposed to be adopted by the player in the game;

posture data acquiring means for acquiring posture data relating to a posture adopted by the player;

a first comparison means for executing a comparison between the exemplary model posture that is supposed to be adopted by the player at the reference time and the posture of the player indicated by the posture data acquired at a compared time that is set based on the reference time;

a second comparison means for executing at least one of: a comparison between a different posture from the exemplary model posture that is supposed to be adopted by the player at the reference time and the posture of the player indicated by the posture data acquired at the compared time; and a comparison between the exemplary model posture that is supposed to be adopted by the player at the reference time and a different posture from the posture of the player indicated by the posture data acquired at the compared time; and output control means for causing output means to perform an output based on a comparison between a comparison result from the first comparison means and a comparison result from the second comparison means, the second comparison means comprising at least one of:

means for executing a comparison between the exemplary model posture that is supposed to be adopted by the player at one of a time before the reference time and a time after the reference time and the posture of the player indicated by the posture data acquired at the compared time;

means for executing a comparison between a posture obtained by making a predetermined change to the exemplary model posture that is supposed to be adopted by the player at the reference time and the posture of the player indicated by the posture data acquired at the compared time;

means for executing a comparison between the exemplary model posture that is supposed to be adopted by the player at the reference time and the posture of the player indicated by the posture data acquired at one of a time before the compared time and a time after the compared time; and means for executing a comparison between the exemplary model posture that is supposed to be adopted by the player at the reference time and a posture obtained by making a predetermined change to the posture of the player indicated by the posture data acquired at the compared time.

* * * * *